(12) United States Patent
Valdes et al.

(10) Patent No.: US 8,799,092 B2
(45) Date of Patent: Aug. 5, 2014

(54) METHODS, APPARATUS, AND SYSTEMS FOR SUPPORTING PURCHASES OF GOODS AND SERVICES VIA PREPAID TELECOMMUNICATION ACCOUNTS

(75) Inventors: Felipe Valdes, Santiago (CL); Olav Carlsen, Santiago (CL)

(73) Assignee: Zonamovil, Inc., Doral, FL (US)

( * ) Notice: Subject to any disclaimer, the term of this patent is extended or adjusted under 35 U.S.C. 154(b) by 0 days.

(21) Appl. No.: 12/965,558

(22) Filed: Dec. 10, 2010

(65) Prior Publication Data

US 2011/0145086 A1 Jun. 16, 2011

Related U.S. Application Data

(60) Provisional application No. 61/286,504, filed on Dec. 15, 2009, provisional application No. 61/295,611, filed on Jan. 15, 2010.

(30) Foreign Application Priority Data

Dec. 8, 2010 (AU) ................................ 2010249214

(51) Int. Cl.
*G06Q 30/00* (2012.01)
*G06Q 40/00* (2012.01)
*G06F 17/00* (2006.01)

(52) U.S. Cl.
CPC ................ *G06Q 30/00* (2013.01); *G06Q 40/00* (2013.01); *G06F 17/60* (2013.01)
USPC .................. 705/26; 705/35; 235/80; 370/352

(58) Field of Classification Search
USPC .............. 705/35, 38, 39, 75; 235/80; 370/352
See application file for complete search history.

(56) References Cited

U.S. PATENT DOCUMENTS 5,557,516 A 9/1996 Hogan
5,704,046 A 12/1997 Hogan
(Continued)

FOREIGN PATENT DOCUMENTS

EP 1718054 A1 11/2006
WO WO 0145379 6/2001
(Continued)

OTHER PUBLICATIONS

University System of New Hampshire Financial and Administrative Procedures, Procedure 4-32 Uncollectible Accounts Receivable Write Off Bad Debts, May 31, 1994 (Uncollectible).*

(Continued)

*Primary Examiner* — Chika Ojiaku
(74) *Attorney, Agent, or Firm* — Wolf, Greenfield & Sacks, P.C.

(57) ABSTRACT

Apparatus and method for detecting in real-time when a User of a prepaid telecommunications account tries to complete a data, voice or financial transaction to purchase a product or service but cannot, due to insufficient funds in the Prepaid Account. The system then determines whether the Account is eligible to receive a Facilitation according to predetermined criteria and, if so, either (1) automatically authorizes the transaction to be completed based on a Facilitation amount, subsequently recorded by the system to satisfy the insufficiency, or (2) instantly communicates to the User an offer to do so, and if the User accepts the offer, authorizes the transaction and records the Facilitation amount. The transaction can then be completed without significant interruption. A mechanism is provided such that on the next Topping-Up event(s) of the User's Account, the Facilitation amount is debited from the User's Account for return to the Facilitator.

36 Claims, 13 Drawing Sheets

(56) References Cited

U.S. PATENT DOCUMENTS

| | | | |
|---|---|---|---|
| 6,137,872 | A | 10/2000 | Davitt et al. |
| 6,285,749 | B1 | 9/2001 | Manto |
| 6,463,139 | B1 | 10/2002 | Davitt et al. |
| 6,584,183 | B2 | 6/2003 | Manto |
| 6,788,771 | B2 | 9/2004 | Manto |
| 6,816,721 | B1* | 11/2004 | Rudisill ............... 455/406 |
| 7,155,417 | B1* | 12/2006 | Sagar et al. ............ 705/68 |
| 7,249,092 | B2* | 7/2007 | Dunn et al. ............ 705/38 |
| 7,472,090 | B1* | 12/2008 | White ................... 705/38 |
| 7,593,898 | B1* | 9/2009 | Tsuei et al. ............ 705/40 |
| 7,665,657 | B2* | 2/2010 | Huh ..................... 235/379 |
| 7,814,015 | B2* | 10/2010 | Benedyk et al. ....... 705/41 |
| 7,958,053 | B2* | 6/2011 | Stone .................... 705/45 |
| 8,010,425 | B1* | 8/2011 | Garcia et al. ........... 705/35 |
| 2001/0027435 | A1* | 10/2001 | Asano et al. ........... 705/38 |
| 2002/0111153 | A1 | 8/2002 | Hartmaier et al. |
| 2002/0194122 | A1* | 12/2002 | Knox et al. ............ 705/39 |
| 2003/0014367 | A1 | 1/2003 | Tubinis |
| 2004/0097245 | A1 | 5/2004 | Sheth et al. |
| 2005/0001028 | A1* | 1/2005 | Zuili .................... 235/382 |
| 2005/0027624 | A1 | 2/2005 | Cai |
| 2005/0278192 | A1* | 12/2005 | Cantini et al. ......... 705/1 |
| 2006/0059085 | A1* | 3/2006 | Tucker ................. 705/38 |
| 2006/0173778 | A1* | 8/2006 | Lipsky et al. .......... 705/40 |
| 2006/0253335 | A1* | 11/2006 | Keena et al. .......... 705/26 |
| 2006/0276180 | A1* | 12/2006 | Henry, Jr. ............. 455/412.2 |
| 2007/0094131 | A1* | 4/2007 | Wymore et al. ....... 705/39 |
| 2007/0106558 | A1* | 5/2007 | Mitchell et al. ....... 705/16 |
| 2007/0136192 | A1* | 6/2007 | German et al. ........ 705/40 |
| 2007/0294164 | A1* | 12/2007 | Wilhelm et al. ....... 705/38 |
| 2008/0014904 | A1* | 1/2008 | Crimi et al. ........... 455/406 |
| 2008/0090551 | A1* | 4/2008 | Gidron et al. .......... 455/406 |
| 2008/0109348 | A1* | 5/2008 | Saxena et al. ......... 705/38 |
| 2008/0119162 | A1 | 5/2008 | Sivalingam et al. |
| 2008/0268812 | A1 | 10/2008 | Meincke |
| 2008/0298569 | A1 | 12/2008 | Monk |
| 2008/0312968 | A1* | 12/2008 | Hannon et al. ........ 705/4 |
| 2009/0044279 | A1* | 2/2009 | Crawford et al. ...... 726/26 |
| 2009/0112744 | A1 | 4/2009 | Park |
| 2009/0157517 | A1* | 6/2009 | Davis ................... 705/17 |
| 2009/0171838 | A1 | 7/2009 | Liu et al. |
| 2009/0192934 | A1 | 7/2009 | Chu et al. |
| 2009/0265260 | A1* | 10/2009 | Aabye et al. .......... 705/30 |
| 2009/0271299 | A1 | 10/2009 | Vasten |
| 2009/0290688 | A1 | 11/2009 | Peters et al. |
| 2010/0049650 | A1* | 2/2010 | Keaton et al. ......... 705/37 |
| 2010/0075630 | A1 | 3/2010 | Tillitt et al. |
| 2010/0104078 | A1* | 4/2010 | Henry et al. .......... 379/114.17 |
| 2010/0268647 | A1* | 10/2010 | Harris .................. 705/44 |
| 2010/0312617 | A1* | 12/2010 | Cowen ................. 705/13 |
| 2010/0312684 | A1* | 12/2010 | Kemper et al. ........ 705/37 |
| 2013/0117174 | A1* | 5/2013 | Cole et al. ............. 705/39 |

FOREIGN PATENT DOCUMENTS

| | | |
|---|---|---|
| WO | WO 0251116 A1 | 6/2002 |
| WO | WO 2007073859 A1 | 7/2007 |
| WO | WO 2007120117 | 10/2007 |
| WO | WO 2007120117 A2 * | 10/2007 |
| WO | WO 2008157502 A1 | 12/2008 |
| WO | WO 2009033249 | 3/2009 |
| WO | WO 2009136407 | 11/2009 |

OTHER PUBLICATIONS http://www.docstoc.com/docs/2850549/pre-paid-debit-card, Feb. 4, 2011.
http://www.howardforums.com/showthread.php?t=1408385, Apr. 16, 2010.
http://www.experts123.com/q/can-the-smartone-prepaid-gift-card-ever-have-a-negative-balance.mht, Apr. 16, 2010.
h20208.www2.hp.com/opencall/library/partners/prepaid_a4.pdf.
http://www.masmovil.es/en-EN/prepago, Feb. 1, 2010.
http://www.tfl.gov.uk/tickets/oysteronline/5469.aspx, Feb. 1, 2010.
http://www.familymobile.co.uk/services/automatic-top-up, Feb. 1, 2010.
http://www.vodafone.in/existingusers/events/pages/chhota_credit.aspx?cid=jnk, Feb. 1, 2010.
http://www.compured-computers.com/masmovil-prepaid-sim-cards-10.html, Feb. 1, 2010.
http://www1.orange.co.uk/service_plans/payasyougo/ways_automatic.html, Feb. 1, 2010.
http://www.tfl.gov.uk./termsandconditions/901.aspx, Feb. 1, 2010.
https://www.worldsim.com/Store/TopUp.aspx, Feb. 1, 2010.
http://www.uscardsource.com/lineofcredit.php, Feb. 1, 2010.
International search report and written opinion for International Application No. PCT/US10/03130, mailed Feb. 11, 2011 (17 pages).
International Preliminary Report on Patentability from International Application No. PCT/US10/03130, mailed Dec. 23, 2011.
European Search Report dated May 16, 2013 from European Application No. 10838017.1.

* cited by examiner

METHODS, APPARATUS, AND SYSTEMS FOR SUPPORTING PURCHASES OF GOODS AND SERVICES VIA PREPAID TELECOMMUNICATION ACCOUNTS

CROSS-REFERENCE TO RELATED APPLICATIONS

This application claims a priority benefit, under 35 U.S.C. §119(e), to U.S. provisional application Ser. No. 61/286,504, entitled "Method and Apparatus for Supporting Purchase of Goods and Services via Prepaid Telecommunications," filed Dec. 15, 2009.

This application also claims a priority benefit, under 35 U.S.C. §119(e), to U.S. provisional application Ser. No. 61/295,611, entitled "Methods, Apparatus, and Systems for Supporting Purchases of Goods and Services via Prepaid Telecommunication Accounts," filed Jan. 15, 2009.

Each of the foregoing applications is incorporated herein by reference in its entirety.

This application also claims a priority benefit, under 35 U.S.C. §119(a), to Australian Application Serial No. 2010249214, entitled "METHODS, APPARATUS, AND SYSTEMS FOR SUPPORTING PURCHASES OF GOODS AND SERVICES VIA PREPAID TELECOMMUNICATION ACCOUNTS," filed on Dec. 8, 2010.

FIELD OF THE DISCLOSURE

The inventive concepts disclosed herein relate to the field of prepaid telecommunication services. More specifically, the inventive methods, apparatus and systems described herein are directed generally to facilitating purchases, via a Mobile Device, of goods (also referred to herein as "products") and/or services by advancing funds to and/or guaranteeing insufficiencies of prepaid telecommunication accounts, wherein a Facilitation (Advance or Guarantee) is made during an attempted purchase and without significantly interrupting the purchase transaction.

GLOSSARY

A glossary of salient terms used herein is set forth below:

Account: For purposes of the present disclosure, the term "Account" refers to a computation/record established between a Subscriber and an Operator which is credited with funds to be used to pay for various telecommunication services provided by or through the Operator to a User, and/or debited based on use of such services by a User.

Account ID: For purposes of the present disclosure, the term "Account ID" refers to any and all identifiers for an Account of a Subscriber with an Operator. Examples of identifiers that may constitute an Account ID include, but are not limited to, one or more identifiers associated with a Mobile Device (e.g., an IMSI for a SIM card installed in a Mobile Device) or other communication device, one or more identifiers associated with one or more access points or connectivity to a communications network of a Mobile Device or other communication device (e.g., an MSISDN, an IP address, a mobile station identification, etc.), and/or one or more identifiers associated with one or more Subscribers or Users. An Account ID may include any number of alphanumeric characters and/or other symbols in any sequence, and may be encoded as data in any format, such as binary or ASCII code.

Advance: For purposes of the present disclosure, the term "Advance" refers to funds or other credits having an equivalent monetary value, provided in connection with a Prepaid Account, in association with an Insufficient Balance Event, to cover the cost of an initiated transaction. An Advance is a type of Facilitation and is typically is provided in a manner that does not significantly interrupt the transaction and thereby facilitates completion of the transaction.

Data Completion Online (DCO): For purposes of the present disclosure, the term "Data Completion Online" (DCO) refers to the process of providing a Facilitation (an Advance or Guarantee) to a Prepaid Account to facilitate completion of a transaction in association with an Insufficient Balance Event.

Facilitation: For purposes of the present disclosure, the term "Facilitation" refers to an Advance or a Guarantee offered and/or provided to facilitate completion of an attempted transaction in association with an Insufficient Balance Event. In some cases, a Facilitation may be offered and/or provided in response to an Insufficient Balance Event currently in progress, where the Prepaid Account already has insufficient funds to cover the attempted transaction. In other cases, a Facilitation may be offered and/or provided in anticipation of an Insufficient Balance Event that has not yet occurred but is predicted to occur if the attempted transaction is allowed to continue, such as when a User's current phone call or data streaming will deplete the Prepaid Account balance within a matter of minutes or seconds.

Facilitation Fee: For purposes of the present disclosure, the term "Facilitation Fee" refers to a fee charged for a Facilitation, typically by a Facilitator.

Facilitator: For purposes of the present disclosure, the term "Facilitator" refers to a party (a person or entity) that offers and/or provides a Facilitation (Advance and/or Guarantee).

Guarantee: For purposes of the present disclosure, the term "Guarantee" refers to authorization of an initiated transaction, in association with an Insufficient Balance Event, to allow the transaction to be completed using an initial amount less than the predetermined price of the transaction (e.g., using only the remaining balance in the Prepaid Account, or using no initial funds from the Prepaid Account), and guaranteeing of the Guarantee amount (Facilitation amount) to the Operator or to the provider of the product and/or service purchased through the transaction. A Guarantee is a type of Facilitation and is typically is provided in a manner that does not significantly interrupt the transaction and thereby facilitates completion of the transaction.

Handshake Interaction: For purposes of the present disclosure, the term "Handshake Interaction" refers to an offer-acceptance communication interaction between a User associated with a Prepaid Account and a Facilitator, in which an offer for a Facilitation is made by the Facilitator during an initiated transaction and the User must affirmatively accept the offer to receive the Facilitation and thereby complete the initiated transaction. The User may be associated with the Prepaid Account by virtue of the User's access to and use of a Mobile Device associated with the Prepaid Account, whether or not the User is the Subscriber for the Prepaid Account. In some embodiments, a Handshake Interaction may be performed in an Opt-In Subscription, either before each Facilitation or only before an initial Facilitation, after which subsequent Facilitations may be provided automatically without Handshake Interactions.

Insufficient Balance Event: For purposes of the present disclosure, the term "Insufficient Balance Event" refers to an attempted purchase or offer of a product and/or service, in either a "pull" transaction or a "push" transaction, absent sufficient funds in a Prepaid Account to cover the cost of the transaction. An Insufficient Balance Event may occur when a Prepaid Account has a positive balance that is not large enough to cover the attempted purchase, when a Prepaid Account has a zero balance, or even when a Prepaid Account has a negative balance.

Mobile Device: For purposes of the present disclosure, the term "Mobile Device" is used generally to describe any of a wide variety of mobile and/or portable devices/terminals that may be used to engage in telecommunications in some form or another. Examples of Mobile Devices include, but are not limited to, traditional mobile or cellular ("cell") phones available from a wide variety of manufacturers, "smart phones" (e.g., a mobile phone with advanced capabilities, often with personal computer-like functionality), personal digital assistants (PDAs), electronic book readers ("e-book readers"), and other relatively small (usually portable) computing devices (e.g., personal computers such as notebook computers, tablet computers, iPads, and the like). Some examples of popular "smart phones" include, but are not limited to, the Apple iPhone (e.g., iPhone 3G S), various models of Blackberry PDAs, various models of Windows Mobile phones by different manufacturers, and various Android- and Symbian-based devices. In some embodiments, a Mobile Device may be a handheld device designed to be able to be held and/or carried in one adult human hand, to fit into a standard sized clothing pocket, such as a pants pocket or jacket pocket, and/or otherwise designed to be easily and readily portable.

Operator: For purposes of the present disclosure, the term "Operator" refers to an entity that provides telecommunications services to multiple Mobile Devices (e.g., via CDMA, GSM, UMTS, LTE, or other wireless communication access networks/systems). An Operator also (or alternatively) may provide wired/land-based telecommunications services, including television, to other types of communication devices. An Operator also is sometimes referred to in the telecommunications industry as a "carrier." Examples of typical services that may be provided by an Operator include, but are not limited to, voice communications, as well as the transfer/transmission of data or other information, which may include web browsing, text messages (SMS), multimedia messages (MMS), data/information relating to images, videos, music or other content, services and applications, and data/information relating to transactions for the purchase of products and/or services. As used herein, the term "Operator" refers in the aggregate to all systems and subsystems of an entity providing telecommunications services. Such subsystems may include, for example, radio, voice and data transmission subsystems, rating subsystems (for determining prices for individual transactions), charging subsystems (for querying Accounts to determine whether sufficient balance is present to cover a transaction, and for requesting that Account funds be reserved and/or deducted to cover a transaction), billing subsystems (for maintaining Account balances and reserving and/or deducting funds from Accounts for transactions, for example in response to charging queries), customer service and relationship management subsystems, and/or financial subsystems, etc.

Opt-In Subscription: For purposes of the present disclosure, the term "Opt-In Subscription" refers to an arrangement in which a Handshake Interaction is required to be performed before a Prepaid Account associated with a Subscriber may receive a Facilitation in association with an Insufficient Balance Event. When a Prepaid Account and/or its Subscriber is subject to an Opt-In Subscription, a User of the associated Mobile Device may be required to affirmatively accept the offer for each Facilitation through a Handshake Interaction before the Facilitation will be provided. Alternatively, a Handshake Interaction may be required the first time a Facilitation is offered to a User of the Mobile Device associated with the Prepaid Account, and provided the User accepts, Facilitations may be performed automatically (e.g., without Handshake Interactions) for that Prepaid Account from that time onward. An Operator or Facilitator may choose to place all of the Prepaid Accounts it manages into Opt-In Subscriptions, or may allow different Subscribers to choose different subscription types for their own Prepaid Accounts.

Opt-Out Subscription: For purposes of the present disclosure, the term "Opt-Out Subscription" refers to an arrangement in which no Handshake Interactions are performed in connection with providing Facilitations to a Prepaid Account associated with a Subscriber. A User of a Mobile Device associated with a Prepaid Account in an Opt-Out Subscription may receive Facilitations automatically, without being queried for and/or notified of acceptance of each Facilitation, unless and until the Subscriber of the Prepaid Account declines the arrangement via an Opt-Out instruction to the Operator or Facilitator. Following such an Opt-Out instruction, the Prepaid Account may be changed to an Opt-In Subscription. An Operator or Facilitator may choose to place all of the Prepaid Accounts it manages into Opt-Out Subscriptions initially by default, or may allow different Subscribers to choose different initial subscription types for their own Prepaid Accounts.

Prepaid Account: For purposes of the present disclosure, the term "Prepaid Account" refers to an Account for which a Subscriber or other User may pre-pay some monetary amount that is credited to the Account and which may be used to pay for products and/or services provided by or through the Operator thereafter. A Prepaid Account associated with an individual Subscriber may include various sub-accounts. For example, a Prepaid Account may include one sub-account for actual monetary funds paid into the Prepaid Account by the Subscriber or another party, and another sub-account for "virtual funds" arising from promotions such as, "Top-Up today and get three times the balance!" If a User were to Top-Up the Prepaid Account under such a promotion, for example, the actual monetary funds provided through the Top-Up may be credited to the actual funds sub-account, while twice the amount of the Top-Up may be credited to the virtual funds sub-account, usable for purchases in the same way as the actual funds. Prepaid Accounts may also include other sub-accounts for other types of credits having equivalent monetary value, such as a sub-account for SMS message credits or web browsing byte credits obtained as part of a package deal. A Prepaid Account may include a sub-account for paying for services that are provided by or through the Operator, and may include a separate sub-account for making monetary balance transfers to third parties (including balance transfers to Prepaid Accounts associated with other Users' Mobile Devices), and/or a separate sub-account for paying for third party services through the Mobile Device and its Operator. Prepaid Accounts include Accounts that are fully prepaid, as well as the prepaid portions of other types of Accounts having prepaid functionality, such as hybrid accounts and control accounts (described below).

Service or Product Provider (SOPP): For purposes of the present disclosure, a "SOPP" refers to a provider of products and/or services that can be purchased via a Mobile Device or other communication device. In many instances, an Operator itself may be considered as a SOPP; for example, the Operator may provide to a User associated with an Account various services or products for purchase at respective fees (e.g., voice calls, television, text messaging or "short message service" (SMS), multimedia message service (MMS), Internet access). In other instances, a third party SOPP may have a relationship with one or more Operators to provide various products and/or services (e.g., music, images, photographs, videos, ringtones, horoscopes, sports information, financial information, financial services (such as mobile commerce money transfers and payments to third parties), entertainment information, applications, etc.) to Users associated with the Operators' established Accounts. A SOPP may be a merchant, a financial institution, or any of various other examples of providers of products and/or services. Such products and/or services may be purchased as "bounded" data transactions, for which a price may be determined prior to initiating the transaction in view of a fixed list price for the product and/or service, or in view of the fixed data size of the product and/or service coupled with a fixed price per data unit. Some products and services provided by SOPPs may be delivered directly to Mobile Devices or other communication devices (e.g., purchased music, images, photographs, videos, ringtones, horoscopes, and the like). In other situations, a Mobile Device or other communication device may be essentially a terminal for executing a transaction for goods and/or services to be delivered in other ways (e.g., to a home or office). Purchases from SOPPs may be on a "pull" transaction or "push" transaction basis (e.g., User receiving "automatic" alerts relating to sports events/teams, financial information, entertainment information, etc.).

Sponsor: For purposes of the present disclosure, the term "Sponsor" refers to a third party, other than a Mobile Device's Subscriber or User, who pays for a User of the Mobile Device to receive a Facilitation. When a Facilitation is provided to the Mobile Device's Prepaid Account in association with an Insufficient Balance Event, the Sponsor may provide all or part of the Facilitation amount needed to cover the attempted transaction. Alternatively, the Facilitation amount may be recorded to be recovered from a subsequent Top-Up of the Prepaid Account by a User, and the Sponsor may cover the amount of a Facilitation Fee charged in connection with the Facilitation. In some embodiments, a Sponsor may be an advertiser who agrees to cover the Facilitation Fee and/or all or part of the Facilitation amount, in exchange for having the Sponsor's advertisement displayed on the Mobile Device at the time of the Facilitation. The Sponsor's advertisement may be for a product and/or service related to the product and/or service being purchased in the current attempted transaction being facilitated, or may be for an unrelated product and/or service.

Subscriber: For purposes of the present disclosure, the term "Subscriber" refers to a person or entity that has established a formal relationship with an Operator so as to access various telecommunications services provided by or through the Operator via a Mobile Device or other communications device.

Top-Up: For purposes of the present disclosure, the term "Top-Up" generally refers to a payment made by a User to a then pre-existing Prepaid Account, often in a predetermined amount per Top-Up (such activity also is sometimes referred to as "recharging" or "loading" a Prepaid Account). To Top-Up, a User may conduct a cash or credit/debit card transaction to effect an electronic transfer of funds to the Prepaid Account for a predetermined amount. Such a transaction may be performed via the Operator (e.g., performed on the Mobile Device itself or at a Point of Sale (POS)), via the Operator's Top-Up distribution channel (typically at an authorized retail point or via an authorized person who can transfer balance from their phone to the User), and/or via a third party (e.g., a merchant, bank, automated teller machine (ATM) or third party POS). In another example of a Top-Up, a User may purchase a "Top-Up card" or "recharge card" at retail. Typically, such cards have a predetermined value (e.g., U.S. $5, $10, $20) and are stamped with a unique code (e.g., under a scratch-off panel) representing the card vendor and the prepaid amount, and this code may be used on the Mobile Device to appropriately credit the Prepaid Account (i.e., add to the balance of the Prepaid Account) and thereby effect the Top-Up. Other ways to Top-Up include voluntary balance transfers from other Users (e.g., a father transferring balance from his Account to son's Account). Balance transfers between accounts managed by the Operator may not require any injection of new funds from outside the Operator's platform.

User: For purposes of the present disclosure, the term "User" refers to a person or entity that has access to various telecommunication services provided by or through an Operator via a Mobile Device or other communications device. A User may be a person or entity that has established a formal relationship with an Operator as a Subscriber (or visitor, in the case of roaming) so as to access such services; a User may also be anyone else who, presumably with permission from a Subscriber, accesses such services. Thus, the identity of a User may or may not be known to an Operator.

BACKGROUND

"Telecommunication" generally refers to the transmission of signals (e.g., electrical, electromagnetic or optical signals) over some distance for the purpose of communication. Various communication devices and methodologies increasingly are becoming part of the everyday lives of people all over the world; this is particularly noteworthy in developing nations and regions which, until recently, have had little if any appreciable infrastructure to support telecommunications on a significant scale. Some common examples of conventional communication devices used for telecommunications include, but are not limited to, "landline" telephones, mobile (or "cellular") phones and other mobile/portable terminal devices, fax machines, devices that receive cable and/or digital television, and a wide variety of computing devices, any of which may make use of a variety of wired or wireless communication infrastructures employing a variety of analog or digital signal forms and communication protocols.

Mobile telephones and other mobile/portable terminal devices (e.g., personal digital assistants, or "PDAs") conventionally have been used primarily for wireless telecommunication activities such as voice calls and text messaging; more recent iterations of these devices support electronic mail ("email") and Internet access. These devices continue to evolve into multi-purpose instruments for engaging in commerce (for example, performing balance transfers and paying for third party services and products) and for performing various tasks beyond simply placing and receiving telephone calls, sending/receiving text messages and email, and limited Internet access.

In a conventional arrangement with an Operator, an owner/User of a Mobile Device or other communication device establishes a subscription or an Account with the Operator (i.e., the owner's carrier or the carrier servicing the owner at a given time), typically pursuant to a service agreement, wherein the Account of the owner (also called a "Subscriber" or "account holder" in such an arrangement) may be credited with funds to be used to pay for various telecommunication and other services provided by or through the Operator, and debited based on use of such services. The Account is associated with an Account ID, which typically includes one or more numbers that uniquely identify the Account (e.g., a telephone number), and may additionally include one or more other identifiers for the Mobile Device or other communication device, and/or one or more user names (e.g., the name of the Subscriber, or a name chosen by the Subscriber) or other information relating to one or more Users.

While an Account associated with a Mobile Device often has only one associated Subscriber, it should be appreciated that in some instances there may be multiple Users of the same Mobile Device, and indeed the actual identity of some or all of these Users may be unknown to the Operator (i.e., at least some of the Users may be anonymous to the Operator). Since the identity of a User may or may not be known to an Operator, Account IDs generally include one or more numbers relating to one or more Mobile Devices themselves, relating to the Account and/or relating to access to the device (as opposed to only identifiers associated more specifically with actual Users of a given Mobile Device).

To this end, a Mobile Device may include a subscriber identity module (a removable "SIM card") on which is stored an "International Mobile Subscriber Identity" number (IMSI), which is a unique number used to identify to an Operator a Subscriber who is using a Mobile Device in which the SIM card is installed. Upon power-up of the Mobile Device, the device sends the IMSI to the Operator via a local network (if one is available to the Mobile Device). In addition to the IMSI, the SIM card also may store, for example, security authentication and ciphering information, passwords, temporary information relating to a local network in which the Mobile Device is being used, a list of services that may be accessed, and the like.

A "Mobile Subscriber Integrated Services Digital Network Number" (MSISDN) is another number which may in some circumstances be used by the network to communicate with a Mobile Device. In particular, whereas an IMSI is an ID number uniquely associated with a SIM card installed in a Mobile Device, an MSISDN is the telephone number normally dialed to access the Mobile Device in which the SIM card is installed. MSISDNs may be different than IMSIs, and accordingly MSISDNs are generally mapped to IMSIs (e.g., in a database maintained by the Operator); in this manner, multiple different MSISDNs may be associated with the same IMSI/SIM card, and/or an MSISDN associated with a given IMSI/SIM card may change over time (to accommodate number portability).

Thus, with respect to an Account ID, one or both of an MSISDN and an IMSI constitute exemplary identifiers that may be used to identify to an Operator an Account of a Subscriber/account holder. More generally, as noted above, an Account ID may include one or more identifiers associated with the Mobile Device itself (e.g., an IMSI for a SIM card installed in a Mobile Device), one or more identifiers associated with the Mobile Device's access points or connectivity to a communications network (e.g., an MSISDN, an IP address, a mobile station identification, etc.), and in some cases one or more identifiers associated with one or more Subscribers or other Users.

Conventional subscriptions with Operators include both "post-pay" (or "post-paid") and "pre-pay" types of Accounts (Prepaid Accounts). In post-pay accounts, the Operator bills the Subscriber after the fact for telecommunications and other services rendered and used (e.g., at the end of every month for services used during that month). In contrast, for a Prepaid Account (also sometimes commonly referred to as "prepaid phone service"), a Subscriber or other User may pre-pay a certain monetary amount, essentially at any time, that is credited to a particular Account established with the Operator and associated with an Account ID. In some instances, an Operator might offer preferred product/service consumption rates for a Prepaid Account, as the Operator incurs virtually no risk of non-payment or of delays in payment; indeed, the Operator may even get free use of any funds in a Prepaid Account until they are consumed. In other instances, an Operator might charge more expensive per-use rates for communication services rendered to prepaid Users, as prepaid Users' consumption may be less stable from month to month than postpaid Users' consumption. Other types of Accounts combine prepaid and postpaid functionalities. For example, there are various types of "hybrid" accounts that are postpaid during certain times of day or days of the week, and prepaid during other times. One example of such a hybrid account is known as Hybrid Corporate Plans. This type of Account is postpaid from 9 am to 6 pm (with the postpaid bill being paid by a corporation) and prepaid at other times (with the "out of office" usage being paid by the employee in a prepaid manner). Another example of combined prepaid and postpaid functionalities can be found in "controlled" accounts, in which the postpaid account has a monthly consumption limit (expressed in monetary terms). When that limit is reached, the service is cut, but the User may Top Up to obtain further services, in a prepaid manner. Combined Accounts such as hybrid accounts and controlled accounts typically include both a postpaid account and a Prepaid Account.

To Top-Up a then pre-existing Prepaid Account, a User may purchase a "Top-Up card" or "recharge card" at retail (e.g., via a kiosk or merchant). Typically, such cards have a predetermined value (e.g., U.S. $5, $10, $20) and are stamped with a unique code (e.g., under a scratch-off panel) representing the card vendor and the prepaid amount. The code on the Top-Up card is entered on the Mobile Device to appropriately credit the Prepaid Account (i.e., add to the balance of the Prepaid Account) and thereby effect the Top-Up. In some rare instances, a service fee for the Top-Up (e.g., a fee payable to the card vendor) may be deducted from the Top-Up card purchase price prior to crediting the Prepaid Account. In any event, funds available in a Prepaid Account generally are strictly limited to the Top-Up amounts provided by one or more Users. From the foregoing, it may be appreciated that a Top-Up usually constitutes an anonymous transaction in that an Operator may not necessarily know who is responsible for providing funds to a Prepaid Account. Other ways of Topping Up are described above.

Following a Top-Up, the Operator thereafter debits the Prepaid Account based on products and/or services provided by or through the Operator corresponding to the Account ID. In some cases, Prepaid Accounts may have time limits within which prepaid amounts must be used before they expire (e.g., 90 days from the date of the most recent Top-Up). In these cases, if additional credit is not added before the expiration (i.e., if there is no pre-expiration Top-Up), some or all of any remaining balance in the Prepaid Account may be lost, and the Operator may even discontinue service.

While the concept of a Prepaid Account is introduced above primarily in the context of a Mobile Device and a mobile/wireless telecommunications Operator, it should be appreciated that a Prepaid Account is not limited in this respect, and also extends to non-mobile applications (e.g., landline phones, internet access, cable TV, pay-per-view TV, and wired/land-based telecommunication Operators). For non-mobile applications, Prepaid Accounts often are used for long-distance calling but in some instances also are used for other purposes. Indeed, a single Prepaid Account could be configured for use in connection with both mobile and non-mobile calling by the account holder.

Prepaid Accounts for mobile or non-mobile applications often may be adopted by Users with weak finances and/or poor credit ratings. Sometimes the need to utilize a Prepaid Account results from an Operator refusing to provide credit to such Users (i.e., in the form of a post-pay Account) or limiting the amount of credit extended. In other instances, Prepaid Accounts may simply be a convenience adopted even by Users with good credit. In any event, the market for Prepaid Accounts is huge—currently, there are more than three billion Users contributing to Prepaid Accounts worldwide, with more than 250 million Users in Latin America alone. On average, these Users Top-Up Prepaid Accounts in amounts of about U.S. $10 per month (at current prices and exchange rates).

As noted above, today a variety of Mobile Devices are used for much more than simply placing voice calls. Many Mobile Devices have the capability, for example, to display images and stream videos, take and transmit photos, access the Internet, download applications, download and play or stream music or other digital media content, purchase books and other digital content electronically (e.g., from the Internet), acquire and transmit the device's location information (e.g., GPS information), and perform financial transactions (transfers and payments) in a secure manner. In many places around the world, such Mobile Devices provide Users with not only their first telecommunications device, but also their first camera, their first music player, their first video player, their first access to the Internet, and their first mobile wallet.

Large industries have been established to deliver, and charge for, a wide variety of products and services that may be purchased via Mobile Devices and other communication devices. Some products and services provided by SOPPs are delivered directly to a Mobile Device or other communication device (e.g., purchased music, images, photographs, videos, ringtones, applications, horoscopes and the like). In other situations, a Mobile Device or other communication device may be essentially a terminal for executing a transaction for the purchase of goods or services to be delivered in other ways (e.g., buying a ticket for public transportation or for the movies, or buying a physical good to be delivered by a package to a home or office), or for transferring funds from a mobile banking Prepaid Account to another User on another Mobile Device, or simply to that User's account at a bank (such use of a Mobile Device for financial services such as balance transfers is often referred to as "Mobile Banking" or "Banking the Unbanked"). Furthermore, while often a User of a Mobile Device initiates a transaction for the purchase of a product and/or service from a SOPP (sometimes referred to as a "pull" transaction), in some instances a SOPP may offer a product and/or service on a "push" transaction basis; i.e., without a User initiating a particular transaction, a SOPP may "automatically" deliver some products and/or services to a Mobile Device or another communication device associated with a particular Account, pursuant to a subscription agreement or by other pre-arrangement (e.g., "automatic" alerts relating to sports events/teams, financial information, particular news or entertainment events, etc.).

FIGS. 1 and 2 generally illustrate the parties to a conventional transaction for the purchase of products and/or services (including financial services and balance transfers) from a third party SOPP (which may be a financial institution in the case of a transaction for a financial service) by a User of a Mobile Device associated with a Prepaid Account with an Operator, and the sequence of information flow between the parties for an exemplary "pull" transaction. In these figures, an exemplary Mobile Device 100 is associated with a Prepaid Account 300 for telecommunication services provided by or through an Operator 200. While a Mobile Device 100 is used in this illustration, it should be appreciated that other types of communication devices similarly may have a Prepaid Account with an Operator and similarly may purchase goods and/or services in the manner described in connection with FIGS. 1 and 2. In general, the Operator 200 maintains an "operator platform," e.g., various computing equipment, switching systems, transmission systems and other network infrastructure to provide telecommunications services and maintain various information relevant to Subscriber Accounts, including the Prepaid Account 300 (e.g., such information may include at least an Account ID and a credit/debit balance for each Account).

In the example transaction illustrated in FIGS. 1 and 2, the operator platform of the Operator 200 also includes an interface to a network 150 and an interface to a network 700. The Operator 200 may be communicatively coupled to Mobile Device 100 through network 150 and may be communicatively coupled to a third party SOPP 500 through network 700. Mobile Device 100 may also have an interface to network 150; and SOPP 500 may also have an interface to network 700. It should be appreciated that the Operator, one or more Mobile Devices, and one or more third party SOPPs may be communicatively coupled by any of a variety of communication means and protocols. Networks 150 and 700 may be separate networks, the same network, or overlapping or non-overlapping portions of a larger network. Each of networks 150 and 700 may be implemented as any type or form of communication network, including (but not limited to) wired, wireless, local- or wide-area networks, cellular networks and the Internet. Any of them may be public or private. In one example, network 150 is a wireless cellular radio network through which Mobile Device 100 and Operator 200 communicate, and network 700 is the Internet, through which Operator 200 and SOPP 500 communicate using any combination of wired and/or wireless connections (e.g., via the Internet). Further, while only one Mobile Device and only one third party SOPP are shown for simplicity in the example of FIGS. 1 and 2, it should be appreciated that multiple Mobile Devices and/or third party SOPPs may be communicatively coupled to the Operator 200. Similarly, a third party SOPP may provide products and/or services in conjunction with more than one Operator.

In connection with one or more third party SOPPs to which the Operator 200 may be communicatively coupled and with which it may have relationships, the operator platform maintained by the Operator 200 also may include information germane to facilitating the purchase of products and/or services from one or more third party SOPPs (e.g., the operator platform may maintain identifying information for a given third party SOPP, one or more SOPP Accounts for third party SOPPs, appropriate accounting information so that Accounts of Subscribers may be appropriately debited and credited as necessary based on transactions with one or more third party SOPPs or the Operator itself as a SOPP, etc.).

In FIG. 1, a User of the Mobile Device 100 initiates a "pull" transaction to purchase a product and/or service from the third party SOPP 500, as indicated by the query "A," which is transmitted first to the Operator 200 (e.g., via network 150, which may include a wireless communication link to which the Mobile Device has access). The query "A" generally includes the Account ID for the Prepaid Account 300 associated with the Mobile Device 100, and some information that identifies the requested product and/or service. The Operator 200 identifies the SOPP from the query "A" (e.g., via information maintained by the operator platform that associates the requested product and/or service with the SOPP who provides it) and, if the Operator 200 does not already have stored information mapping the requested product and/or service to a purchase price, passes the query "A", or a subset of the query "A", to the SOPP 500 (e.g., via a network 700 such as the Internet).

The SOPP 500 then sends a message "B" to the Operator 200, including the Account ID from the query "A", and either the purchase price for the product and/or service requested in the query "A," or a product/service identifier from which the Operator 200 can determine the purchase price of the requested product/service (e.g., via information maintained by the operator platform in connection with the SOPP 500). In some instances, it should be appreciated that the purchase price provided by the SOPP for the requested product/service may not necessarily be an actual/fixed price but rather an estimate; for example, if the product/service requested relates to a data transmission of unknown or uncertain length, for which the required time and/or bandwidth to complete the transmission may not be known with certainty a priori (e.g., voice or data flows), the SOPP may estimate a purchase price for the transaction, or a unit price for increments of the transaction, and provide this information as part of the message "B".

The Operator 200 then determines (e.g., via the operator platform's billing/account information) if there are sufficient funds in the Prepaid Account 300 corresponding to the Account ID provided in message "B" to cover the purchase price (or, for a financial service such as a balance transfer or payment to a third party, the amount to be transferred or paid out from the Prepaid Account 300 for the transaction). If so, as shown in FIG. 2, the Operator 200 sends an authorization message "X" to the SOPP 500, and the SOPP 500 then transfers to the Mobile Device 100, via the Operator 200, the product and/or service in communication "Y". Alternatively, if the product/service is of a type that is not necessarily delivered directly to the Mobile Device 100 itself, the communication "Y" may be a message confirming completion of the transaction. Also, if the product and/or service is already stored at the Operator 200 prior to the transaction, communication "Y" may be initiated at the Operator 200 and delivered to the Mobile Device 100, without need for communication "X" or for involvement of the SOPP 500 in communication "Y". The Operator 200 appropriately debits the Prepaid Account 300 in the amount of the purchase price (the Operator may do this before passing on the communication "Y" to the Mobile Device, during delivery of the communication "Y", or after delivery of the communication "Y"). The Operator 200 also issues a corresponding credit to the SOPP 500 in the amount of the purchase price (e.g., in a manner similar to the Prepaid Account 300 associated with the Mobile Device 100, the operator platform may include a SOPP Account associated with the SOPP 500 that may be appropriately credited and debited by the Operator 200).

The foregoing process is summarized in the flow diagram shown in FIG. 3. FIG. 3 illustrates the case in which the product/service and price information are stored at the SOPP 500 rather than at the Operator 200; however, as discussed above, the process may be altered accordingly if the price information and/or the product/service itself are already stored at the Operator 200. In particular, as indicated in block 10, the Mobile Device 100 first sends the purchase query "A" to the Operator 200, with the Account ID for the Prepaid Account 300 and product/service/vendor information. In block 20, the Operator passes the purchase query "A" to the appropriate third party SOPP 500, and in block 30 the SOPP replies to the Operator with the message "B" including the Account ID from the query "A" and information relating to the purchase price. In block 40, the Operator replies to the SOPP with the authorization message "X" indicating that the Prepaid Account 300 has sufficient funds for the purchase, and then in block 50 the SOPP sends the product/service in the communication "Y" (or a purchase confirmation message) to the Mobile Device via the Operator. Finally, in block 60, the Operator deducts the purchase price from the Prepaid Account 300 and credits the SOPP 500 for same.

Although the process outlined in FIGS. 1-3 illustrates a "pull" transaction for the purchase of a product and/or service from a third party SOPP 500, it should be appreciated that a similar, albeit somewhat simpler, process occurs if the SOPP for the product/service requested by a User of the Mobile Device 100 is the Operator 200 itself. In particular, the Operator 200, as a SOPP, would still attend to an authorization step after a purchase query from the Mobile Device 100 to ensure that the Prepaid Account 300 includes sufficient funds to cover the purchase price of the requested product and/or service. Similarly, for "push" transactions in which a product and/or service may be provided "automatically" by a SOPP for a particular price per transaction (e.g., pursuant to a subscription or other pre-arrangement), the Operator 200 would still attend to an authorization step to ensure sufficient funds exist in the Prepaid Account 300 prior to automatic delivery of the product/service.

As illustrated by the process outlined in FIGS. 1-3, if a User of the Mobile Device 100 associated with the Prepaid Account 300 desires to purchase goods and/or services from either the Operator 200 as a SOPP or the third party SOPP 500, or allow for successful push transactions from a SOPP, the Prepaid Account 300 needs to have sufficient funds to complete the transaction; if, on the other hand, the Prepaid Account 300 is depleted or has insufficient funds for the purchase, the transaction cannot be completed. In the case of voice or data flows, the call or download may be cut off when the Prepaid Account 300 becomes depleted, such that the transaction is only partially completed.

Accordingly, in some instances a User associated with a Prepaid Account may begin a purchase ("pull") transaction only to find out during the attempted purchase that there are insufficient funds in the Prepaid Account. Similarly, a SOPP may attempt to deliver a product/service as a "push" transaction, and discover that there are insufficient funds in the Prepaid Account associated with the intended recipient. Under such circumstances, the transaction is interrupted and not completed at that time; if the User desires to continue with the purchase (or receive products/services automatically via push transactions), the User must Top-Up the Prepaid Account with sufficient funds. For example, as discussed above, a new prepaid Top-Up card of sufficient value must be purchased and credited to the Prepaid Account, or sufficient funds have to be otherwise electronically transferred to the Prepaid Account (e.g., via an ATM using a debit/credit card or through a balance transfer from a retail Top Up distributor). In some instances, the User may not have funds readily available to buy a prepaid Top-Up card or to conduct an electronic transfer of funds to Top-Up the Prepaid Account and, accordingly, the transaction is rejected and the revenue is lost. Even if the User does have funds available for a Top-Up, the Top-Up activity takes time and generally requires actions that interrupt the User's attempt to purchase the product and/or service—and in this lapse, the User's transaction, the User's interest in the purchase, and the context of the transaction also may be lost.

Many attempted purchases of products and/or services from a SOPP are impulse purchases and/or time sensitive (e.g., text message, download a ringtone or horoscope, purchase a song or game, etc.); accordingly, as a result of an interruption due to insufficient funds in a Prepaid Account, many attempted purchases by Users associated with Prepaid Accounts are never completed. More specifically, it is estimated that every month, over 10 billion attempts by Users to purchase products and/or services via a Mobile Device fail due to insufficient funds in a Prepaid Account.

SUMMARY

The Inventors have recognized and appreciated that due to insufficient funds in Prepaid Accounts for telecommunication services, there is a significant lost opportunity and unrealized revenue for both telecommunication service Operators, as well as third party Service Or Product Providers (SOPPs) of products and/or services ("content") that can be purchased via a Mobile Device or other communication device. In particular, it is currently estimated that the combined annual loss of revenue to Operators in Latin America alone, due to rejected purchases based on insufficient funds in Prepaid Accounts, amounts to on the order of U.S. $1 billion (estimates may vary from country-to-country with population, popularity of prepaid services, usage patterns, tariffs, etc.).

For Operators, the loss of revenue due to insufficient funds in Prepaid Accounts is compounded by costs for wasted overhead. More specifically, Operators incur infrastructure costs to support various telecommunication services, including transactions for the purchase of goods and services (e.g., Operators need to provide sufficient bandwidth on their various networks at required times). Transactions that are not consummated waste valuable and often constrained resources (e.g., time, network bandwidth, infrastructure capacity), which translates to a portion of an Operator's infrastructure investment being wasted or used inefficiently. Accordingly, from an Operator's perspective, each uncompleted transaction not only is a lost revenue opportunity, but also contributes to unproductive overhead for the Operator.

In addition to the drain on Operator resources, transactions that are not consummated waste other communications resources as well. As discussed above in connection with FIGS. 1-3, Operators and SOPPs often communicate via the global Internet, or alternatively at least partially through other communications networks, and a considerable amount of communication between Operators and SOPPs often is devoted to ascertaining the sufficiency of funds in Prepaid Accounts. For example, the Inventors have estimated that 70-98% of "push" transactions are attempted and fail due to Insufficient Balance Events in emerging markets. This type of communication traffic requires physical resources that both parties must provide, at some expense, and some amount of Internet (or other) connection bandwidth for which they have to pay, none of which generates offsetting revenue in the case of transactions that are not consummated. Such unproductive traffic, moreover, may delay other productive communications and contribute to communication bottlenecks.

Accordingly, the Inventors have recognized and appreciated that overcoming the obstacle of insufficient funds in Prepaid Accounts holds significant promise not only for increasing Operator and SOPP revenue by enabling the completion of connections and transactions that otherwise would be blocked, but also for addressing a significant technical problem by reducing unproductive or wasteful communications traffic between Operators and SOPPs, thereby freeing-up and making more efficient use of valuable communication resources. Overcoming the obstacle of insufficient funds in Prepaid Accounts further promises to increase User satisfaction by completing a higher percentage of attempted purchases and adding flexibility to an otherwise rigid commercial offering. In addition to allowing the completion of more transactions, retaining Users on the Operator network has enormous value from the Operator's perspective. In many markets, as many as 50% of all prepaid Users have SIM cards from more than one Operator. When such Users run out of balance in one Operator's Prepaid Account, they often switch to the other Operator's SIM. Thus, the original Operator has a much higher risk of losing the customer, for an indeterminate amount of time, when such a SIM-swap occurs. From a loyalty and continuous-link (an "umbilical cord") standpoint, keeping the User on the network has a strong effect of reducing churn.

A challenge, however, is overcoming the obstacle of insufficient funds in Prepaid Accounts via one or more solutions that are relatively inexpensive and expeditious, and that place relatively little burden on Users (i.e., add minimum friction to the User experience). In many instances, products and/or services purchased via a Mobile Device or other communication device often involve relatively inexpensive per-transaction charges (e.g., perhaps from a few cents to a few dollars). Thus, an approach that can efficiently administer completion of such transactions in spite of insufficient funds in Prepaid Accounts arguably needs to do so inexpensively to be commercially viable. Such an approach also must operate quickly (e.g., in essentially "real-time," such as in the midst of an initiated transaction, with minimal impact on a User) if impulse purchases are to be facilitated toward completion. In other words, the call, the ringtone download, etc., should not be interrupted.

In view of the foregoing considerations, various embodiments of the present invention are directed to methods, apparatus, and systems for supporting purchases of goods and services via prepaid telecommunication accounts. As discussed above, prepaid telecommunication accounts may include Accounts associated with both Mobile Devices and fixed-line prepaid services such as landline telephone, cable and/or digital television, and interne access. In various examples of the inventive methods, apparatus, and systems disclosed herein, insufficient funds in a Prepaid Account may be detected essentially in "real-time" as a transaction is attempted, or predicted beforehand, with respect to a predetermined price for the attempted transaction. A Facilitation amount may be determined so as to facilitate the attempted transaction, either by covering the entire price for the attempted transaction, or by covering an amount different from the price, such as an amount of insufficiency of the Prepaid Account with respect to the price, or an estimation of the price for transactions of undetermined size (e.g., a voice call, or, in general, services that are flows). Funds equal to the Facilitation amount may be advanced in some manner in connection with the Prepaid Account (e.g., credited to the Prepaid Account, logged into an advance register associated with the Prepaid Account, or debited from an available advance balance register associated with the Prepaid Account), and/or the Facilitation amount may be guaranteed by authorizing the transaction and guaranteeing the Facilitation amount to the Operator and/or SOPP. In this manner, without requiring a User to Top-Up, the cost of the transaction (e.g., purchase price) may be covered so that the attempted transaction may be completed essentially seamlessly. In some cases in which the price for the attempted transaction is an estimate, the Facilitation amount provided may be larger than the amount actually utilized, and thus a remainder of funds from the Facilitation may continue to be available to the User after the particular transaction is completed.

One of multiple noteworthy aspects of the solutions provided by the inventive methods, apparatus, and systems discussed herein arises from the Inventors' recognition that the typical process of recharging a Prepaid Account (e.g., via purchase of a "Top-Up card" or electronic transfer of funds) is at least in part "manually" executed by a User—and if a User encounters insufficient funds in a Prepaid Account upon attempting a transaction to purchase a product and/or service, the manual nature of conventional techniques for accomplishing a Top-Up necessarily interrupts the initiated transaction, which then may be lost. Indeed in the case of push transactions, a User may not even know that a transaction was attempted and failed, and thus in many instances there is not even an opportunity for the User to realize they may need to Top-Up.

Accordingly, in one aspect of the inventive methods, apparatus and systems disclosed herein, in response to an Insufficient Balance Event, a Prepaid Account may be provided with funds, e.g., an Advance, to cover the cost of an initiated transaction, instead of requiring a User to Top-Up. In another aspect, a Facilitation amount associated with an Insufficient Balance Event may be guaranteed, herein referred to as a "Guarantee", to cover the cost of the initiated transaction, allowing the purchase to be initially completed using less than the predetermined purchase price (e.g., using only the balance in the Prepaid Account, if any). Facilitations (e.g., Advances and/or Guarantees) may be provided on the condition that the Facilitation amount will be recovered from a subsequent Top-Up of the Prepaid Account. In one important aspect, the Facilitation may be provided in a manner that does not significantly interrupt the transaction and thereby facilitates completion of the transaction (e.g., the Facilitation may be provided "instantly," during the transaction in process—such as in an automated method, or even beforehand in a predictive manner). The process of providing a Facilitation to a Prepaid Account to facilitate completion of a transaction in response to an Insufficient Balance Event, without requiring the User to Top-Up themselves, is referred to herein as "Data Completion Online" (DCO).

A Facilitation to a Prepaid Account may be offered and/or provided by a party referred to as a "Facilitator." In some implementations, an Operator or a SOPP also may serve in the role of Facilitator, while in other implementations the Facilitator may be an independent third party to the transaction. Also, it should be appreciated that a given Facilitator may provide its services in connection with a single Operator or SOPP, or to multiple Operators or SOPPs, and their customers, so as to facilitate completion of transactions that give rise to Insufficient Balance Events. In one aspect, a Facilitator may provide an Advance "directly" from its own source of funds; in another aspect, a Facilitator may offer an Advance and, if the offer for the Advance is accepted, the Advance may be provided by another funding source (e.g., a debit/credit card previously identified pursuant to a subscription or agreement with the Facilitator, or a bank or other financial institution). Similarly, in other aspects, a Facilitation amount that is guaranteed but not recovered from a subsequent Top-Up within a certain amount of time may be guaranteed to the Operator and/or SOPP through the Facilitator's own source of funds or from another funding source.

In one exemplary embodiment discussed herein, a Facilitation may be offered by a Facilitator to a User of a Mobile Device associated with the Prepaid Account at the time an attempted transaction fails. In another exemplary embodiment discussed herein, a service to provide a Facilitation to a particular Prepaid Account in response to an Insufficient Balance Event may be offered by a Facilitator in anticipation of one or more transactions that may give rise to an Insufficient Balance Event (e.g., a User associated with a Prepaid Account may enter into a subscription or agreement with the Facilitator to automatically provide Facilitations to the Prepaid Account as needed). In another embodiment, the providing of Facilitations may become part of the Operator's prepaid service definition for all Users, all Users being provided Facilitations automatically unless they decide to Opt-Out of this particular service.

In another aspect of the inventive methods, apparatus and systems disclosed herein, a Facilitation Fee may be charged for a Facilitation. Since in many cases a typical transaction cost may be quite small, in general a Facilitation Fee may also be relatively small (e.g., perhaps a few cents); otherwise, it may not be attractive for a User subject to a Facilitation Fee to accept the Facilitation when offered by the Facilitator. In some exemplary implementations, a Facilitation Fee may be paid by another party (e.g., an Operator, a SOPP, or a Sponsor) rather than charged to the Prepaid Account.

In yet another aspect, following a Facilitation by a Facilitator, the Facilitation amount and any Facilitation Fee (if charged to the Prepaid Account) may be recovered by deducting these amounts from one or more subsequent Top-Ups of the Prepaid Account and crediting these amounts to the Facilitator (or ultimately to a funding source providing the Facilitation). For example, the next time a User of a Mobile Device associated with the Prepaid Account recharges or Tops-Up the Prepaid Account following a Facilitation, the Facilitation amount and Facilitation Fee, if any, may be automatically withdrawn from the Prepaid Account and credited to the Facilitator (or other funding source). Alternatively, the Facilitation amount and any Facilitation Fee may be recovered from a third party source (e.g., a Sponsor) rather than from a Top-Up or other operation involving the Prepaid Account.

In yet another aspect, the cost of administering a DCO process and the risk of loss may be carefully managed to ensure the commercial viability of the process. To this end, in some exemplary embodiments, predetermined polices may be implemented by the Facilitator, based on a variety of criteria, to determine whether to offer a Facilitation. Such criteria may be related to a variety of relevant factors such as, for example, the Prepaid Account (e.g., historical usage ("consumption"), Top Up and Facilitation service usage and repayment behavior), the particular product and/or service requested, and/or the SOPP providing the product/service. Additionally (or alternatively), various criteria may be used in connection with policies for determining a limit on the amount of an offered Facilitation. Policies and/or criteria for administering a DCO process may in some implementations be established by the Facilitator itself; alternatively or additionally, policies and/or criteria may be established in whole or in part by one or more other entities (e.g., an Operator, a SOPP, a banking institution, credit institution, regulatory institution, or government institution, etc.), and adopted in whole or in part by the Facilitator.

In some exemplary implementations of the inventive methods, apparatus, and systems disclosed herein, a Facilitator may employ a server, such as a web server, to implement a DCO process. In one exemplary implementation, with reference again to the "pull" transaction illustrated in FIGS. 1 and 2, an Operator may receive information from a SOPP regarding an attempted transaction (e.g., the message "B" shown in FIG. 1) and determine if the attempted transaction gives rise to an Insufficient Balance Event (i.e., there are insufficient funds in the Prepaid Account to complete the transaction). The Operator may then send a message to the Facilitator's server about the Insufficient Balance Event in essentially real-time, i.e., as the transaction is being attempted. An exemplary "Insufficient Balance Event message" from the Operator to the Facilitator's server may include the Account ID for the Prepaid Account from which the transaction was attempted, and the cost associated with the attempted transaction (e.g., purchase price) and/or an amount of the insufficiency (i.e., the amount of a Facilitation needed to complete the transaction); alternatively, or in addition, the message from the Operator to the Facilitator may include the balance of the Prepaid Account, from which an amount of the insufficiency may be computed based on the transaction cost. The Insufficient Balance Event message also may provide other information, examples of which include, but are not limited to, the identity or category of products or services involved, the identity of the SOPP providing the products or services, and other billing and Operator-specific information as required.

In an alternative exemplary implementation of a DCO process, a Facilitator may have access to the operator platform of one or more Operators, and thus may electronically access relevant information pertaining to one or more Prepaid Accounts with the Operator(s). A transaction initiated at a Mobile Device (or other communication device) associated with a given Prepaid Account (e.g., the query "A" shown in FIG. 1) may flow through the Facilitator's server to a SOPP (e.g., the Facilitator's server, rather than the Operator, may direct the query "A" to an appropriate SOPP), and/or information from a SOPP regarding an attempted transaction (e.g., the message "B" shown in FIG. 1) may flow to the Facilitator (e.g., rather than, or in addition to, the Operator). Based on the relevant information provided by the SOPP (e.g., Account ID, product/service identifier and/or cost associated with transaction) and the Facilitator's access to the Operator's records, the Facilitator, rather than the Operator, may determine if an Insufficient Balance Event arises from the attempted transaction.

Following receipt of an Insufficient Balance Event message from the Operator, or determination by the Facilitator itself of an Insufficient Balance Event, in some implementations the Facilitator's server may automatically offer a Facilitation (e.g., an Advance or Guarantee) to the Prepaid Account. In other implementations, the Facilitator's server may evaluate an eligibility and/or creditworthiness associated with the Prepaid Account according to predetermined policies or criteria, which in some instances may be based on historical usage of the Prepaid Account (e.g., Top-Up and debit behavior/patterns, which may include information about particular products and/or services, including prices, consumption and Top-Up frequency and recency, categories and/or vendors of products and/or services, purchased via the Prepaid Account in the past). Similarly, the attempted transaction itself also (or alternatively) may be evaluated, such as to determine whether the category of products or services, and/or the identity of the SOPP, qualifies (is "provisioned") for a Facilitation pursuant to some policy or criteria established and/or adopted by the Facilitator (e.g., no Facilitations allowed for transactions relating to gambling activities).

To offer a Facilitation (e.g., an Advance or Guarantee) to a Prepaid Account in response to an Insufficient Balance Event, in some exemplary implementations the Facilitator's server may initiate an offer-acceptance "Handshake Interaction" by sending a message (e.g., SMS/MMS message, USSD pop-up, interactive voice response or "IVR" call) to the Mobile Device associated with the Prepaid Account, in which a Facilitation is offered to the User of the Mobile Device so as to complete the transaction. The message also may indicate a Facilitation Fee associated with the Facilitation. The User may accept the offer (e.g., via a return SMS/MMS message, USSD confirmation, or speaking a particular response into the Mobile Device), thereby entering into a self-enforcing contract (i.e., the Prepaid Account is credited with the Advance, or the Facilitation amount is guaranteed).

In another exemplary implementation, a Prepaid Account may be eligible for an "automatic" Facilitation (e.g., Advance or Guarantee) without an offer-acceptance Handshake Interaction, pursuant to a pre-existing implicit (Opt-Out Subscription) or explicit (Opt-In Subscription) arrangement with the Facilitator (e.g., a subscription to provide automatic/instant Facilitations to a Prepaid Account; historical usage of the Prepaid Account that illustrates significant creditworthiness, etc.). In one aspect of this implementation, such an automatic Facilitation may nonetheless be conditioned in some cases by other policies/criteria relating not necessarily to the Prepaid Account, but rather to the nature of the products/services and/or SOPP (e.g., notwithstanding an agreement to provide automatic Facilitations, such Facilitations may not be provided for transactions relating to "prohibited" gambling activities).

In addition to the revenue-generating possibilities provided by the inventive concepts discussed herein in connection with commercial transactions using Prepaid Accounts, the disclosed methods, apparatus and systems provide a significant technical effect as well. As noted above, conventional transactions that are not consummated due to insufficient funds in Prepaid Accounts waste valuable, and often constrained, communications resources (e.g., time, network bandwidth, infrastructure capacity). Furthermore, such interrupted or uncompleted transactions generate unproductive communication traffic that may contribute to communication bottlenecks and thereby delay or interfere with other productive communications, negatively affecting the service as perceived by Users. The inventive concepts disclosed herein accordingly provide an effective solution to a significant technical problem by appreciably mitigating, or in some cases entirely eliminating, wasted or inefficiently used communication resources formerly associated with interrupted and uncompleted transactions using Prepaid Accounts. As a result, valuable, expensive communication resources may be used more efficiently and productively.

In summary, one type of embodiment of some aspects of the present invention is directed to apparatus for facilitating a purchase of a product and/or a service via a Prepaid Account associated with a User and a telecommunications service, the apparatus comprising: at least one network interface; a memory to store processor-executable instructions and other information; and at least one processor communicatively coupled to the at least one network communication interface and the memory, wherein upon execution of the processor-executable instructions, the at least one processor A) determines a Facilitation amount based on a predetermined monetary amount for a current attempted transaction to purchase the product and/or have the service performed via the User's Prepaid Account, wherein a balance of the Prepaid Account is less than the predetermined monetary amount, and a sum of the balance and the Facilitation amount is equal to or greater than the predetermined monetary amount, B) generates at least one authorization message effective to allow release of the product to the User and/or performance of the service without requiring a Top-Up of the Prepaid Account prior to the release and/or performance, C) controls the at least one network communication interface so as to transmit the at least one authorization message to an Operator associated with the Prepaid Account and/or to a Service or Product Provider (SOPP) associated with the product and/or the service, and D) records the Facilitation amount in the memory.

Another type of embodiment is directed to apparatus for facilitating a purchase of a product and/or a service via a Prepaid Account associated with a Subscriber and a Mobile Device, the apparatus comprising: at least one network communication interface; a memory to store processor-executable instructions and other information; and at least one processor (e.g., a microprocessor) communicatively coupled to the at least one network communication interface and the memory, wherein upon execution of the processor-executable instructions, the at least one processor A) determines a Facilitation amount based on a predetermined price of a product and/or a service for a current attempted purchase of the product and/or the service via the Subscriber's Prepaid Account, wherein a balance of the Prepaid Account is less than the predetermined price, and a sum of the balance and the Facilitation amount is equal to or greater than the predetermined price, B) generates at least one authorization message effective to allow release of the product and/or the service to the Mobile Device without requiring a Top-Up of the Prepaid Account prior to the release of the product and/or the service to the Mobile Device, C) controls the at least one network communication interface so as to transmit the at least one authorization message to an Operator associated with the Prepaid Account and/or to a Service or Product Provider (SOPP) associated with the product and/or the service, and D) records the Facilitation amount in the memory.

Another type of embodiment is directed to a method comprising: A) via a computer, determining a Facilitation amount for each of a plurality of transactions in progress, wherein the Facilitation amount for each transaction in progress is determined based on a predetermined price of a product and/or a service whose purchase is attempted in the respective transaction in progress by a User of a Mobile Device having an associated Prepaid Account with an Operator, wherein a balance of the Prepaid Account is less than the predetermined price, and a sum of the balance and the Facilitation amount is equal to or greater than the predetermined price, and wherein the predetermined price for at least one of the plurality of transactions in progress is different from the predetermined price of at least one other of the plurality of transactions in progress; B) for each of the plurality of transactions in progress, 1) with the computer, generating at least one authorization message effective to allow release of the product and/or the service to the Mobile Device without requiring a Top-Up of the Prepaid Account prior to the release of the product and/or the service to the Mobile Device, 2) transmitting the at least one authorization message from the computer over a network to the Operator and/or to a Service or Product Provider (SOPP) associated with the product and/or the service, thereby facilitating the purchase within the respective transaction in progress, and 3) recording the Facilitation amount in a computer-readable memory.

Another type of embodiment is directed to at least one tangible computer-readable medium encoded with computer-executable instructions that, when executed by a processor, perform a method for facilitating a purchase of a product and/or a service via a Prepaid Account associated with a Subscriber and a Mobile Device, the method comprising: A) determining a Facilitation amount based on a predetermined price of a product and/or a service for a current attempted purchase of the product and/or the service via the Subscriber's Prepaid Account, wherein a balance of the Prepaid Account is less than the predetermined price, and a sum of the balance and the Facilitation amount is equal to or greater than the predetermined price; B) generating at least one authorization message effective to allow release of the product and/or the service to the Mobile Device without requiring a Top-Up of the Prepaid Account prior to the release of the product and/or the service to the Mobile Device; C) transmitting the at least one authorization message to an Operator associated with the Prepaid Account and/or to a Service or Product Provider (SOPP) associated with the product and/or the service; and D) recording the Facilitation amount in a memory.

Another type of embodiment is directed to apparatus for use with a Prepaid Account associated with a Subscriber and a Mobile Device, the apparatus comprising: at least one network communication interface; a memory to store processor-executable instructions and other information; and at least one processor (e.g., a microprocessor) communicatively coupled to the at least one network communication interface and the memory, wherein upon execution of the processor-executable instructions, the at least one processor A) compares a balance of the Subscriber's Prepaid Account with a predetermined price of a product and/or a service for a current attempted purchase of the product and/or the service via the Subscriber's Prepaid Account; B) upon determining, based on the comparing, that the balance is insufficient for the current attempted purchase, controls the at least one network communication interface so as to transmit at least one Facilitation query message to a Facilitator to request a facilitation for the current attempted purchase.

Another type of embodiment is directed to a method comprising: A) via a computer, comparing a balance of a Prepaid Account, associated with a Subscriber and a Mobile Device, with a predetermined price of a product and/or a service for a current attempted purchase of the product and/or the service via the Subscriber's Prepaid Account; B) upon determining, based on the comparing, that the balance is insufficient for the current attempted purchase, transmitting at least one Facilitation query message from the computer to a Facilitator to request a Facilitation for the current attempted purchase.

Another type of embodiment is directed to at least one tangible computer-readable medium encoded with computer-executable instructions that, when executed by a processor, perform a method for use with a Prepaid Account associated with a Subscriber and a Mobile Device, the method comprising: A) comparing a balance of the Subscriber's Prepaid Account with a predetermined price of a product and/or a service for a current attempted purchase of the product and/or the service via the Subscriber's Prepaid Account; B) upon determining, based on the comparing, that the balance is insufficient for the current attempted purchase, transmitting at least one Facilitation query message to a Facilitator to request a Facilitation for the current attempted purchase.

Another type of embodiment is directed to apparatus for facilitating a purchase of a product and/or a service via a Prepaid Account associated with a Subscriber and a Mobile Device, the apparatus comprising: at least one network communication interface; a memory to store processor-executable instructions and other information; and at least one processor (e.g., a microprocessor communicatively coupled to the at least one network communication interface and the memory, wherein upon execution of the processor-executable instructions, the at least one processor A) determines whether a current attempted purchase of a product and/or a service via the Subscriber's Prepaid Account satisfies eligibility criteria for facilitation, wherein a balance of the Prepaid Account is less than a predetermined price of the product and/or the service for the current attempted purchase of the product and/or the service, and B) only if it is determined that the current attempted purchase satisfies the eligibility criteria for facilitation, 1) determines a Facilitation amount based on the predetermined price, wherein a sum of the balance and the Facilitation amount is equal to or greater than the predetermined price, 2) generates at least one authorization message effective to allow release of the product and/or the service to the Mobile Device without requiring a Top-Up of the Prepaid Account prior to the release of the product and/or the service to the Mobile Device, 3) controls the at least one network communication interface so as to transmit the at least one authorization message to an Operator associated with the Prepaid Account and/or to a Service or Product Provider (SOPP) associated with the product and/or the service, and 4) records the Facilitation amount in the memory.

Another type of embodiment is directed to a method comprising: A) via a computer, determining whether a current attempted purchase of a product and/or a service via a Prepaid Account associated with a Subscriber and a Mobile Device satisfies eligibility criteria for facilitation, wherein a balance of the Prepaid Account is less than a predetermined price of the product and/or the service for the current attempted purchase of the product and/or the service; and B) only if it is determined that the current attempted purchase satisfies the eligibility criteria for facilitation, 1) determining a Facilitation amount based on the predetermined price, wherein a sum of the balance and the Facilitation amount is equal to or greater than the predetermined price, 2) generating at least one authorization message effective to allow release of the product and/or the service to the Mobile Device without requiring a Top-Up of the Prepaid Account prior to the release of the product and/or the service to the Mobile Device, 3) transmitting the at least one authorization message from the computer over a network to an Operator associated with the Prepaid Account and/or to a Service or Product Provider (SOPP) associated with the product and/or the service, thereby facilitating the current attempted purchase, and 4) recording the Facilitation amount in a computer-readable memory.

Another type of embodiment is directed to at least one tangible computer-readable medium encoded with computer-executable instructions that, when executed by a processor, perform a method for facilitating a purchase of a product and/or a service via a Prepaid Account associated with a Subscriber and a Mobile Device, the method comprising: A) determining whether a current attempted purchase of a product and/or a service via the Subscriber's Prepaid Account satisfies eligibility criteria for facilitation, wherein a balance of the Prepaid Account is less than a predetermined price of the product and/or the service for the current attempted purchase of the product and/or the service; and B) only if it is determined that the current attempted purchase satisfies the eligibility criteria for facilitation, 1) determining a Facilitation amount based on the predetermined price, wherein a sum of the balance and the Facilitation amount is equal to or greater than the predetermined price, 2) generating at least one authorization message effective to allow release of the product and/or the service to the Mobile Device without requiring a Top-Up of the Prepaid Account prior to the release of the product and/or the service to the Mobile Device, 3) transmitting the at least one authorization message to an Operator associated with the Prepaid Account and/or to a Service or Product Provider (SOPP) associated with the product and/or the service, and 4) recording the Facilitation amount in a memory.

Another type of embodiment is directed to apparatus for facilitating a purchase of a product and/or a service via a Prepaid Account associated with a Subscriber and a Mobile Device, the apparatus comprising: at least one network communication interface; a memory to store processor-executable instructions and other information; and at least one processor (e.g., a microprocessor) communicatively coupled to the at least one network communication interface and the memory, wherein upon execution of the processor-executable instructions, the at least one processor A) determines a price of a product and/or a service for a current attempted purchase of the product and/or the service via the Subscriber's Prepaid Account, wherein the price is determined specifically for the current attempted purchase, and wherein the determined price is different from at least one other price specific to a purchase of the same product and/or service via a different Subscriber's Prepaid Account, B) determines, prior to authorizing release of the product and/or the service, a Facilitation amount based on the determined price, wherein a balance of the Prepaid Account is less than the determined price, and a sum of the balance and the Facilitation amount is equal to or greater than the determined price, C) generates at least one authorization message effective to allow release of the product and/or the service to the Mobile Device without requiring a Top-Up of the Prepaid Account prior to the release of the product and/or the service to the Mobile Device, D) controls the at least one network communication interface so as to transmit the at least one authorization message to an Operator associated with the Prepaid Account and/or to a Service or Product Provider (SOPP) associated with the product and/or the service, and E) records the Facilitation amount in the memory.

Another type of embodiment is directed to a method comprising: A) via a computer, determining a price of a product and/or a service whose purchase is attempted in a current transaction in progress by a User of a Mobile Device having an associated Prepaid Account with an Operator, wherein the price is determined specifically for the current transaction in progress, and wherein the determined price is different from at least one other price specific to a different transaction to purchase the same product and/or service via a different Prepaid Account; B) determining, prior to authorizing release of the product and/or the service, a Facilitation amount based on the determined price, wherein a balance of the Prepaid Account is less than the determined price, and a sum of the balance and the Facilitation amount is equal to or greater than the determined price; C) with the computer, generating at least one authorization message effective to allow release of the product and/or the service to the Mobile Device without requiring a Top-Up of the Prepaid Account prior to the release of the product and/or the service to the Mobile Device; D) transmitting the at least one authorization message from the computer over a network to the Operator and/or to a Service or Product Provider (SOPP) associated with the product and/or the service, thereby facilitating the purchase within the current transaction in progress; and E) recording the Facilitation amount in a computer-readable memory.

Another type of embodiment is directed to at least one tangible computer-readable medium encoded with computer-executable instructions that, when executed by a processor, perform a method for facilitating a purchase of a product and/or a service via a Prepaid Account associated with a Subscriber and a Mobile Device, the method comprising: A) determining a price of a product and/or a service for a current attempted purchase of the product and/or the service via the Subscriber's Prepaid Account, wherein the price is determined specifically for the current attempted purchase, and wherein the determined price is different from at least one other price specific to a purchase of the same product and/or service via a different Subscriber's Prepaid Account; B) determining, prior to authorizing release of the product and/or the service, a Facilitation amount based on the determined price, wherein a balance of the Prepaid Account is less than the determined price, and a sum of the balance and the Facilitation amount is equal to or greater than the determined price; C) generating at least one authorization message effective to allow release of the product and/or the service to the Mobile Device without requiring a Top-Up of the Prepaid Account prior to the release of the product and/or the service to the Mobile Device; D) transmitting the at least one authorization message to an Operator associated with the Prepaid Account and/or to a Service or Product Provider (SOPP) associated with the product and/or the service; and E) recording the Facilitation amount in a memory.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
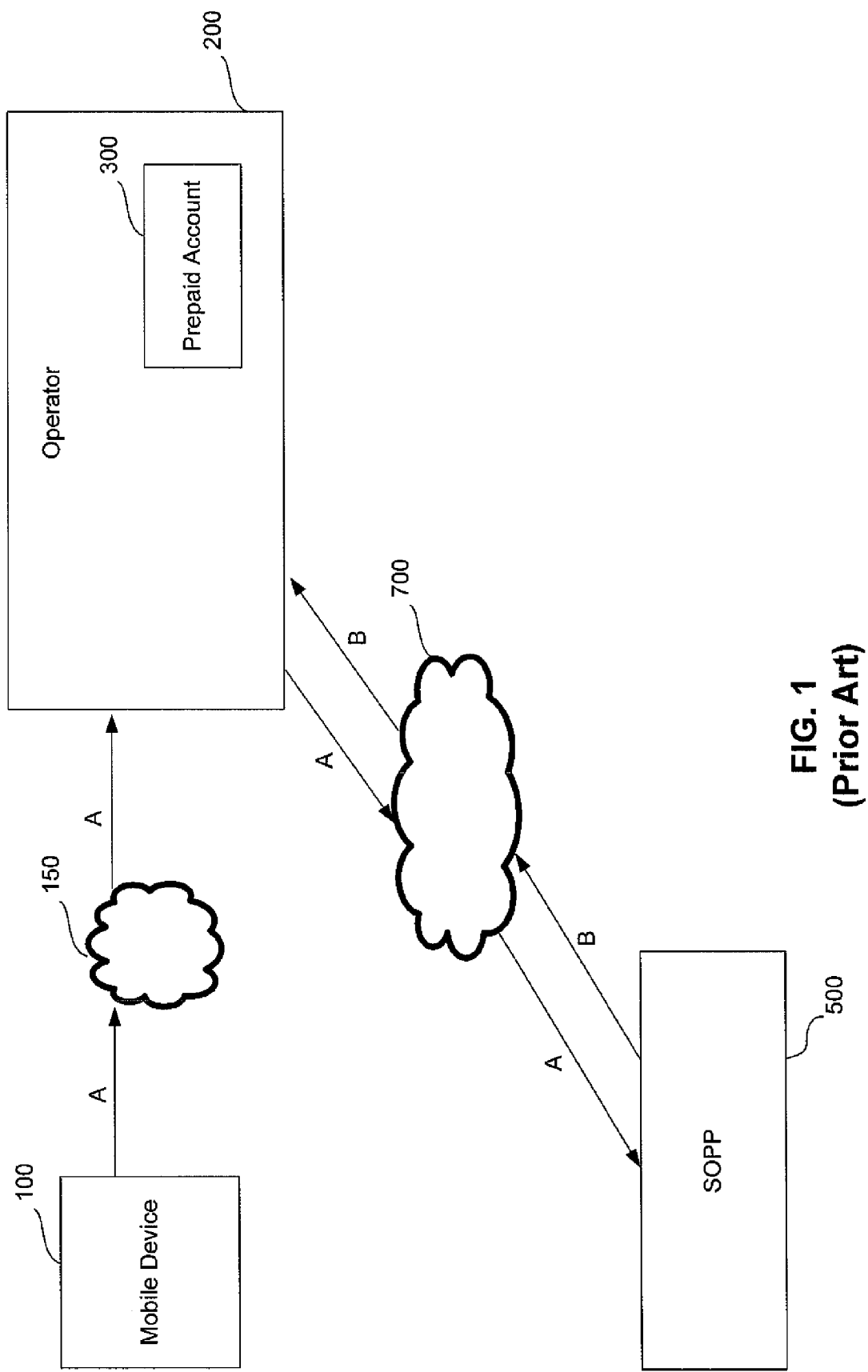
FIGS. 1 and 2 generally illustrate the parties to a conventional transaction for the purchase of products and/or services from a Service Or Product Provider (SOPP) by a User of a Mobile Device associated with a Prepaid Account at a telecommunications service Operator, and the flow of information between the parties.

Following below are more detailed descriptions of various concepts related to, and examples of embodiments of or for practicing aspects of the invention, including inventive methods, apparatus, and systems for supporting purchases of goods and services via prepaid telecommunication accounts. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. Unless otherwise indicated or required by context, illustrated embodiments are exemplary of types of embodiments such that particular instantiations may vary from the illustrations; also, embodiments should be assumed not to be mutually exclusive.

As stated above, there will be shown herein new method(s), and corresponding apparatus, intended to increase User satisfaction and on-the-network time, and decrease User frustration with Prepaid Accounts for phones and other electronic devices, particularly mobile phones and other Mobile Devices, while at the same time delivering increased revenue to Operators and, if applicable, SOPPs, without increasing (and perhaps decreasing) their collection risks. (It should be understood that, in general, references to mobile phones herein are applicable to other Mobile Devices for which prepaid communication plans are available.) Further, the percentage of non-revenue-generating traffic in the phone network (and related Internet or other network connections) may be reduced.

The apparatus detects in real-time (or forecasts shortly before) when a User tries to complete a data or voice transaction but cannot, due to insufficient funds in the User's Prepaid Account balance. It then either (1) automatically authorizes the transaction to proceed, based on an amount of funds (the "Facilitation" amount) provided or guaranteed by the Facilitator (i.e., a third-party source or the Operator itself), or (2) instantly communicates to the User an offer (for example, via an SMS or MMS message, or a data or USSD session, or a voice or IVR (Interactive Voice Response) call, etc. to the User's phone) for an opportunity to receive a Facilitation (e.g., an Advance or a Guarantee) in an amount at least sufficient to complete the transaction, either one for a fee or for no fee. In the first (i.e., automatic) case, there will have been a prior agreement, explicit or implicit, between the Facilitator and the User or Subscriber (or between the Operator and the User or Subscriber) providing for the delivery and collection of such Facilitations. In the second (i.e., offer Handshake Interaction) case, if the User accepts the offer (e.g., by sending a suitable message back, per instructions in the message received), the Advance is credited to the Prepaid Account (or an associated Subscriber Advance Account) or the Guarantee is recorded and guaranteed, and the intended transaction can be completed. (Completion of the transaction can occur automatically, without the User having to do anything further, in at least some example embodiments.)

It may be useful to record the transaction (in a computer-accessible memory) as subject to a Facilitation, to facilitate account reconciliation between all parties involved, Facilitation recovery, and determination of Prepaid Account ratings in the future.

In some instances, an Operator's service agreement may provide, explicitly or implicitly, for Facilitations to eligible Subscribers, allowing a Subscriber to "Opt-Out" of this default arrangement and either decline the opportunity to receive Facilitations completely or elect to receive offers for Facilitations on a transaction-by-transaction basis, or for only transactions meeting certain criteria.

As an alternative to SMS messaging, voice messaging or other communications may be used between the Operator and User. For example, an interactive voice response system may be actuated to call the User's Mobile Device, announce the offer, and accept a verbal response or keypad response code for which the User is prompted (e.g., "press one to accept an Advance, any other key to decline").

Naturally, the Facilitator may desire to recover its Facilitation amount as soon as possible, to make a profit on the transaction and to minimize the risk that a User will not repay the Facilitation amount in full within a certain time interval. Collection can be obtained in various ways. According to some embodiments, the User may return the Facilitation amount plus a fee by having both amounts deducted automatically from the Prepaid Account the next time the User "Tops Up" (i.e., replenishes or recharges) the Account. If the User does not add sufficient funds to return the Facilitation amount in full, the entire Top-Up amount or some agreed portion of that amount can be applied to the Facilitation return automatically as a partial return, and full return can be spread over multiple Topping Up events. In some other embodiments, the Operator, the SOPP, Sponsor or some combination of them may pay the fee or a portion of the fee. This is feasible as the Operator and SOPP both receive revenue they otherwise would not have received, so it is still a net positive result for them if they share a little of their profit with the Facilitator to cover the Facilitator's fee.

Consequently, the User can fulfill his or her perceived needs, and the Operator and the SOPP can complete the transaction, in some embodiments recognizing revenue and increasing their Average Revenue per User ("ARPU"). (It is assumed that some transactions would be completed in the future were the inventive system and method unavailable, but it is also believed that some transactions otherwise never would be completed.)

This approach may be applied to some or all data transactions (e.g., internet, SMS, MMS, content, and others) and to voice calls, as well. However, there is a significant difference between transactions originating from (a) voice and data streaming (flows) and (b) bounded data transactions (events). As used herein, a "bounded data transaction" involves advance knowledge of the amount of data being requested or to be sent, and the charge therefor. For example, if the User wishes to download a song, the SOPP's charge for the content will be known and the Operator's charge for the transmission will be known, so it is a simple matter to determine whether the Prepaid Account balance is or is not sufficient to pay for the transaction. Other examples of bounded data transactions include purchases of ringtones, horoscopes, stock quotes, weather reports, text messages and fixed-size (e.g., non-streaming) music, images, photographs, videos, applications and other data. However, a voice or data streaming transaction, such as a phone call or the streaming of music, usually is of indeterminate length (in time and bytes) at the outset.

For voice calls, Facilitations may be provided in one of two ways, among others: (a) the Facilitator may complement a Prepaid Account balance by a variable amount—which depends on Prepaid Account scoring and/or service variables—when the Prepaid Account reaches a certain minimum balance threshold (i.e., during a call), independent of whether the Advance is finally used in its entirety in the particular call or event that originated the Advance, or (b) upon placing a call or stream with less than a minimum balance, the system advances a preset amount as a complementary balance (e.g., before a call is connected). These actions may be performed with or without interfering with the call process.

The Facilitator may set limits, overall or per Prepaid Account or per category of Prepaid Account or product or service subject to Facilitations, on the amount(s) it will advance and/or guarantee on behalf of a Prepaid Account. (For example, a limit of zero—no Facilitations—may be set for some types of services.) These limits, the fees the Facilitator charges (at least when the Subscriber is responsible for some portion of those fees), and the Prepaid Account's Top Up and data consumption history may be collected and stored in a suitable computer-readable database(s) of the Operator, the Facilitator, both of them, and/or a third party. That information then may serve as a basis for Subscriber profiling and credit scoring, so that decisions about whether to make a Facilitation, and the Prepaid Account's credit limit, can be based on the Operator's and Facilitator's experience with the Prepaid Account, such as past consumption, top up history, Facilitation service history, type of product/service subject to the Facilitation, and personal information (if the Prepaid Account is not anonymous).

The Facilitator may be paid for its funding services by the Users or by SOPP's, or some combination of the two, or other third parties Sponsors such as advertisers, through the Operators (typically, the payment is indirect, as payments are withheld by each Operator on behalf of the Facilitator and applied to the Facilitator's account). Various pricing models may be employed and it is not our intention to limit pricing to the example models discussed here.

According to one example, a User may pay the Facilitator, on the next User Top-Up event, the Facilitation amount plus, in some cases, a charge (the Facilitation Fee). The charge can take any form and be in any amount allowed by law, such as, but not limited to, one or more of a fixed transaction fee, a percentage of the service/asset/content price, and a percentage of the Facilitation amount. The percentage can be fixed or can be time-dependent such as an interest rate, so that the actual fee paid by the User may depend on the time elapsed from the date of the Facilitation to the date of the Top-Up. The interest rate and/or any fixed component of a charge may depend on a credit rating score of the Subscriber, the price/type of the service/asset/content, and/or the Facilitation amount to be provided, among other criteria. Such rating may be obtained from an external source of ratings or the Facilitator may generate its own ratings as a function of its and/or the Operator's past experience with the Subscriber Account. (Recall that with a Prepaid Account, the identity of the User is usually unknown, so the rating may be based on the history of the Account, represented by the Subscriber's phone number, mobile identifier, or other proxy for the User.)

Figure 2:
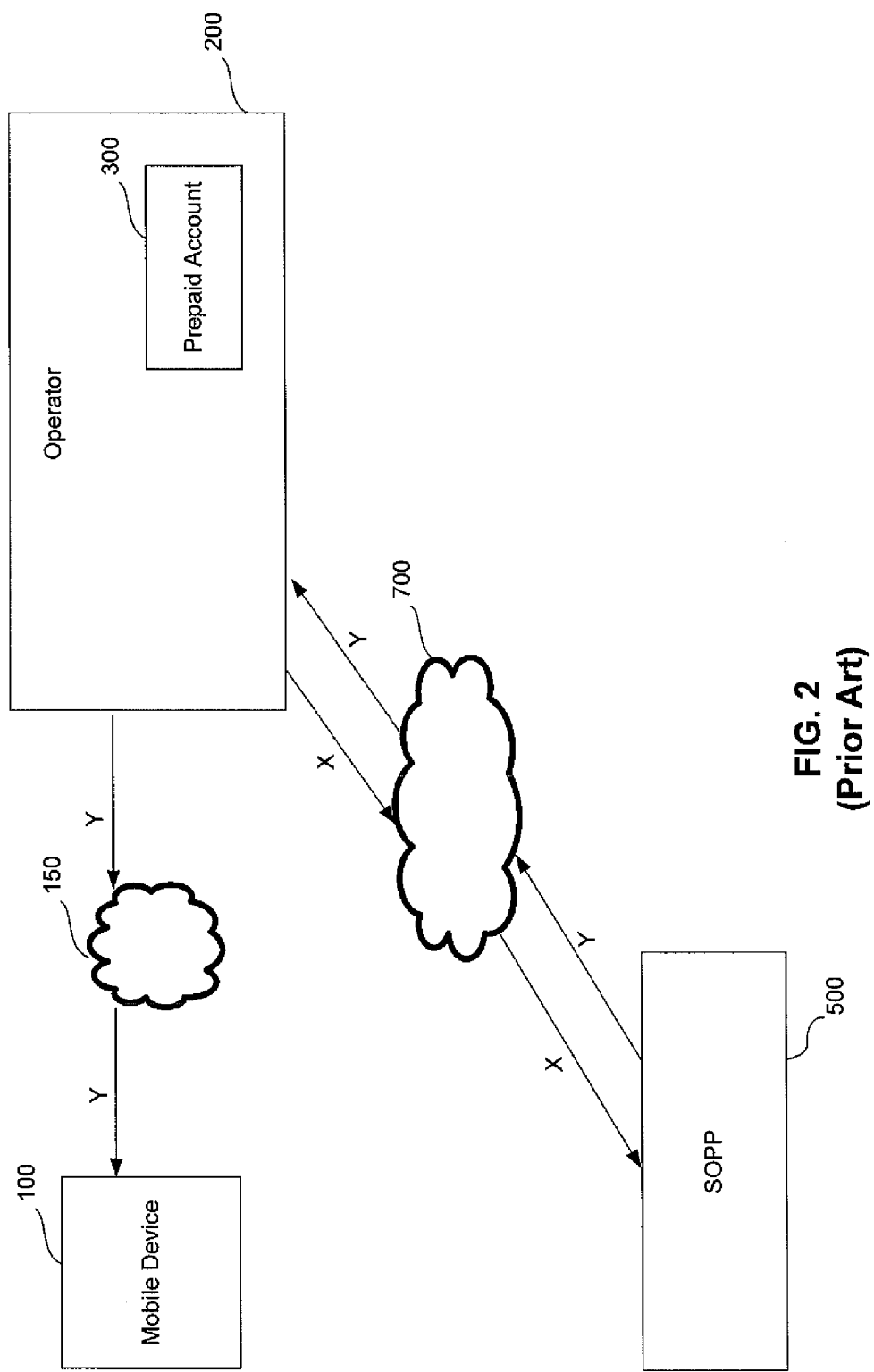
Figure 3:
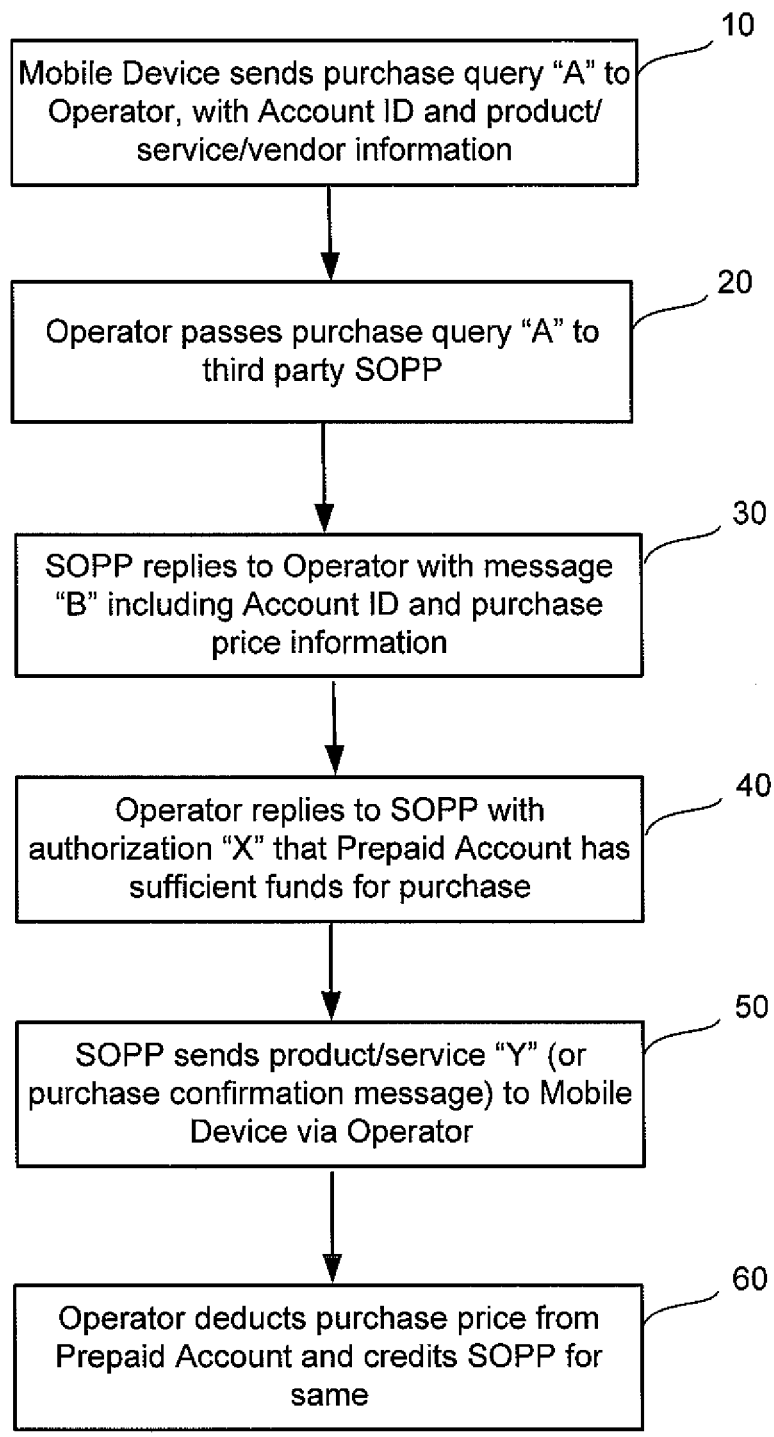
FIG. 3 is a flow diagram summarizing the transaction process illustrated in FIGS. 1 and 2.

The "Data Completion Online" (DCO) process for completion of transactions from Prepaid Accounts with insufficient funds, as discussed above, may be contrasted with the conventional transaction outlined in connection with FIGS. 1 and 2 (and summarized in the flow diagram of FIG. 3). In particular, FIGS. 4-8 illustrate the parties to a transaction and the flow of information between the parties pursuant to a DCO process according to some exemplary embodiments of the present invention.

Figure 4:
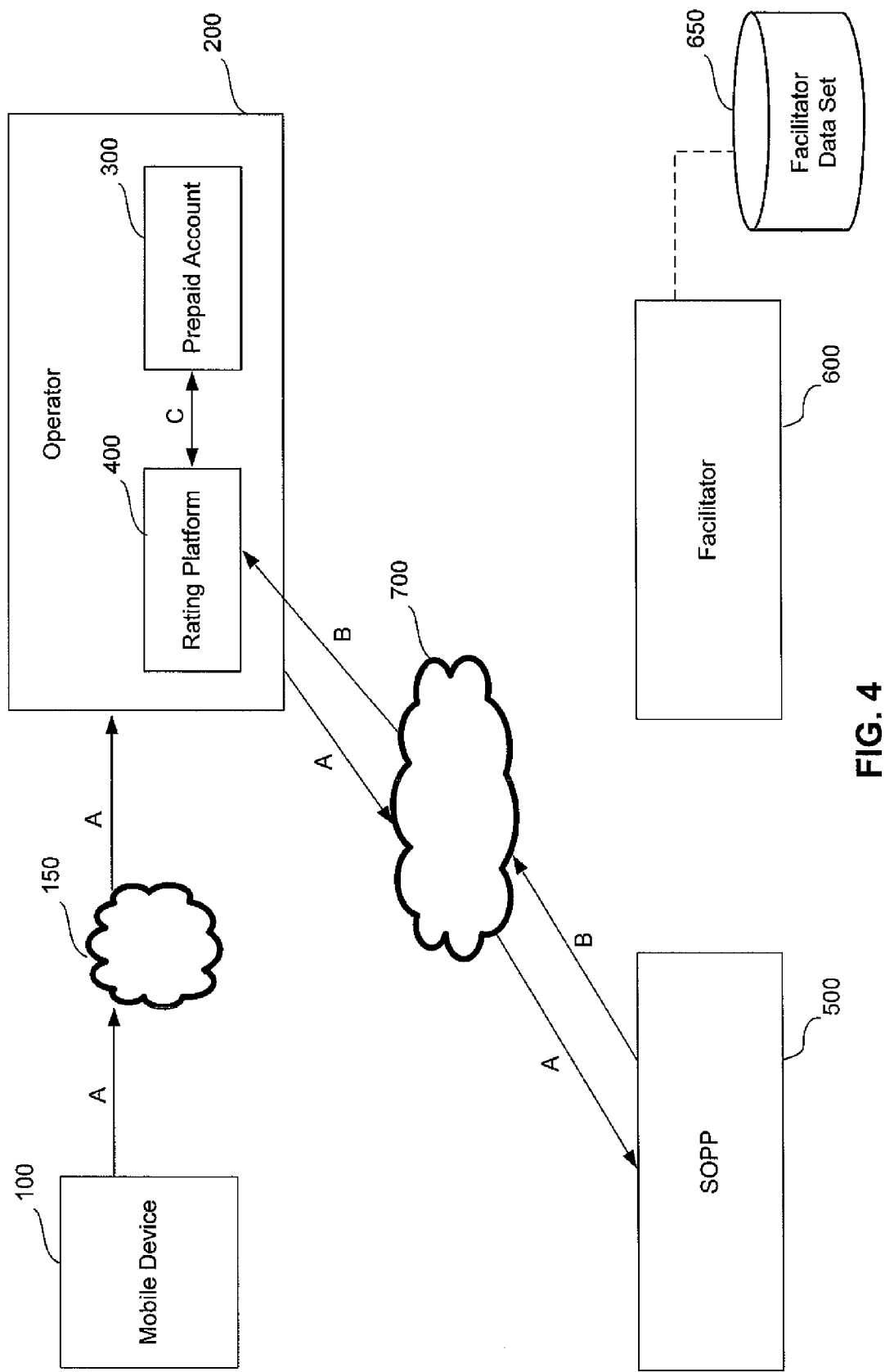
FIGS. 4 to 8 illustrate the parties to a transaction and the flow of information between the parties pursuant to a "Data Completion Online" (DCO) process according to some exemplary embodiments of the present invention.

With reference now to FIG. 4, an exemplary network environment is illustrated for facilitating purchases of products and/or services via a Prepaid Account 300 associated with a Mobile Device 100, in accordance with some embodiments of at least some aspects of the present invention. The network environment includes an Operator 200 in communication with Mobile Device 100 and with a SOPP 500. In contrast with the conventional organization as illustrated in FIGS. 1 and 2, the network environment illustrated in FIG. 4 also includes a Facilitator 600. As discussed above, the Facilitator 600 may be a third party, or may represent a service provided by Operator 200 itself and/or by SOPP 500. A platform of Facilitator 600 is a computer or computer system for interacting with other parties' computer systems, and may be implemented as a stand-alone infrastructure or may alternatively be integrated with the platform of Operator 200 and/or the platform of SOPP 500. In some embodiments, functionality of Facilitator 600 may be implemented on a separate server from Operator 200; while in other embodiments, some or all of Facilitator 600's functionality may be implemented within the infrastructure of Operator 200, such as through a Facilitation sub-account within or associated with Prepaid Account 300. It should be appreciated that Operator 200, SOPP 500 and Facilitator 600 may be implemented as separate platforms, machines and/or devices, or as one or more integrated platforms comprising one or more machines and/or devices (e.g, software modules on shared computers), as aspects of the present invention are not limited in this respect. Operator 200, SOPP 500 and Facilitator 600 may be implemented as one or more computers and/or computing devices, such as servers, including one or more processors and one or more memory devices and/or components, each executing appropriate program code modules to fulfill its functions. Any memory may comprise one or more tangible, non-transitory computer-readable media encoded with computer-executable instructions that, when executed by any of the one or more processors, cause Operator 200, SOPP 500 and/or Facilitator 600 to perform any of the functions described herein. It should be appreciated, however, that aspects of the present invention are not limited to any particular form of implementation of the platforms of Operator 200, SOPP 500 or Facilitator 600. References herein to Operator, SOPP and Facilitator should be understood, where appropriate, to refer to the indicated party's computer platform.

It should be understood that Operator 200 is not just an entity, for example, but that the entity has certain equipment—hardware and software—typical of carriers. Such equipment may include, for example, a phone (e.g., cellular) network, a telecommunications switch Intelligent Network node(s) or signaling point(s), a billing subsystem, a Subscriber information database, and a subsystem for managing the various actions required to place and receive calls, messages and data sessions. The billing subsystem, database and call management subsystem may be implemented in various ways, but frequently will comprise one or more servers, each with one or more programmable processors and memory in which is stored programming that when executed on the processor(s) implement not only the usual functions of a wireless carrier but also those functions ascribed herein to the Operator.

The Operator, SOPPs and Facilitator(s) may interact via any available means of electronic communication, including both private networks such as dedicated local and wide-area networks and public networks such as the global Internet. The choice of communications media is not a limiting aspect of the invention. In some embodiments, each of these entities may provide an applications programming interface (API) or similar configuration through which it may communicate with other entities. By providing its API to others, the others can conform their messaging and instructions to the form and content that the entity will understand.

Additionally, it may prove useful for the Operator, SOPPs and Facilitator(s) to be able to obtain management-type information on demand. For example, a SOPP may desire to learn how much business it has done over a certain period of time as a result of transactions enabled by Facilitations. Since the SOPP may not be able to distinguish in its own records whether a transaction was financed by a Facilitation, it may want to be able to query the Operator's records and/or the Facilitator's records. For these purposes, such parties may, for example, provide a secure web server through which the other parties, with proper authentication, can issue queries and obtain reports.

As illustrated in FIG. 4, Mobile Device 100 may transmit a communication "A", through network 150, to Operator 200 to initiate a "pull" transaction for a particular product and/or service offered by SOPP 500. In various embodiments, the initiation of the transaction may represent a request for any of various products and/or services for which a known or estimated monetary amount of the attempted transaction may be determined prior to authorization, including, but not limited to, bounded data transactions, voice and/or data streaming, and financial services such as balance transfers and/or payments to third parties. As in the conventional transaction illustrated in FIG. 1, communication "A" may include an Account ID for the Prepaid Account 300 associated with Mobile Device 100, in addition to some information that identifies the requested product and/or service as well as the SOPP providing the requested product and/or service. For example, the User of Mobile Device 100 may have seen an advertisement with instructions to send a particular text message to a particular destination number in order to purchase a particular product and/or service. The User may send such a text message as communication "A", which may include the Account ID for Mobile Device 100 and the destination number. Operator 200 may have stored information allowing Operator 200 to map the destination number and/or the message to the appropriate SOPP 500, for example in a database or other data set of destination numbers and/or text messages associated with various SOPPs. Having identified the SOPP 500 corresponding to the purchase request of communication "A", Operator 200 may route communication "A" to SOPP 500 through network 700.

In some embodiments, Operator 200 may attach a transaction ID to communication "A" to uniquely identify the transaction currently being attempted by the User of Mobile Device 100. Such a transaction ID may comprise any suitable number, character, symbol or sequence of numbers, characters and/or symbols, and may be encoded in any suitable data format, as aspects of the present invention are not limited in this respect. In addition, it should be appreciated that communication "A", as well as any other communication described herein, may be implemented, encoded, transmitted and/or received in any suitable form and/or fashion, as aspects of the present invention are not limited in this respect. In place of or in addition to the transaction ID, Operator 200 may in some embodiments attach a timestamp to communication "A" to identify the date and time of its receipt at Operator 200 (or Mobile Device 100 may attach a timestamp to communication "A" to identify the date and time of its transmission from Mobile Device 100). Such a timestamp, in combination with the Account ID, may also serve to uniquely identify the transaction currently being attempted by the User of Mobile Device 100.

SOPP 500 may have stored information allowing SOPP 500 to map the destination number and/or the message of communication "A" to a particular product and/or service offered by SOPP 500, for example in a database or other data set of destination numbers and/or text messages associated with various products and/or services. As such, having received communication "A" from Operator 200, SOPP 500 may identify the product and/or service being requested by the User of Mobile Device 100. In some embodiments, SOPP 500 may also identify a predetermined purchase price for the product and/or service, or a predetermined price for the transaction to purchase the product and/or service. It should be appreciated that, in some embodiments, the price for the purchase transaction may not be the same as a general listed price for the product and/or service being purchased in the transaction. For example, there may be one or more promotions for which the Subscriber of Prepaid Account 300 qualifies, which may cause the price of the purchase to be different for Prepaid Account 300 than for Prepaid Accounts of other Subscribers with respect to a purchase of the same product and/or service. Operator 200 may also provide promotions related to SOPP 500 or to the particular product and/or service that are not provided by other Operators. A purchase may also be associated with different prices during different periods of time or in different locations, depending on promotional periods, differing markets, etc. It should be appreciated that an unlimited number of possible promotions may exist; just a few examples of suitable promotions include, "Five free ringtones when you buy your new prepaid phone," "Consume 1 GB of data and get another GB free," "50% off on text messages to the U.S. on July $4^{th}$," etc. As such, in some embodiments, SOPP 500 may identify the predetermined price for the purchase being attempted through communication "A", taking into account any criteria applicable to Prepaid Account 300 and/or promotional adjustments to be applied to a list price for the product and/or service, and then transmit to Operator 200 a communication "B" including the Account ID from communication "A", any corresponding transaction ID and/or timestamp, a SOPP ID for SOPP 500 and the predetermined price for the attempted purchase.

In other embodiments, however, SOPP 500 may not identify a price for the current attempted purchase or a price for the product and/or service being requested, but may simply identify a product/service ID for the product and/or service. The product/service ID may comprise any suitable number, character, symbol or sequence of numbers, characters and/or symbols, and may be encoded in any suitable data format, as aspects of the present invention are not limited in this respect. SOPP 500 may include the product/service ID in communication "B" transmitted to Operator 200, along with the Account ID, any corresponding transaction ID and/or timestamp and the SOPP ID. In some embodiments, SOPP 500 may also transmit the product/service itself to Operator 200 at this point, and Operator 200 may hold the product/service while it is determined whether the price for the attempted purchase can be covered by funds in Prepaid Account 300 and/or by Facilitation, before releasing the product/service to Mobile Device 100. In other embodiments, Operator 200 may store or have access to the product/service even before the attempted transaction is initiated. Operator 200 may also in some embodiments store the information required to map the information in communication "A" to the product/service ID, such that there is no need to forward communication "A" to SOPP 500, or for SOPP 500 to reply with communication "B".

In some embodiments, communication "B" (or communication "A", if no additional information is needed from SOPP 500) may be received directly by, or may be otherwise routed to, a rating platform 400 for identifying the predetermined price corresponding to the current attempted purchase. In the example of FIG. 4, rating platform 400 is integrated with Operator 200; however, it should be appreciated that rating platform 400 may alternatively be integrated with another entity, such as SOPP 500 or Facilitator 600, or may be an independent third party, as aspects of the present invention are not limited in this respect. Rating platform 400 may have access to information, for example in a database(s) or other data set of rating platform 400, Operator 200, SOPP 500 and/or Facilitator 600, allowing rating platform 400 to identify the correct price for the currently attempted purchase based on the information received in communication "B" (or communication "A"). The information in the data set may include, for example, details of various promotions involving Mobile Device 100, Operator 200, Prepaid Account 300, SOPP 500, the particular product and/or service being requested and/or the timestamp of the current transaction. The information may also include specific rates for which Prepaid Account 300 is eligible due to one or more subscriptions, contracts or the like entered into by the Subscriber of Prepaid Account 300. Based on such information, mapped to the Account ID, SOPP ID and product ID specified in communication "B" (or determined from communication "A"), rating platform 400 may in some embodiments determine the price for the attempted purchase. In some embodiments, such a predetermined price for the attempted purchase may be able to be identified prior to authorizing the release of the product and/or service to Mobile Device 100, owing to the product and/or service being purchased as a bounded data transaction of fixed and predetermined size, an estimable credit amount required for a data flow, a financial transfer of a particular monetary amount, etc. As used herein, the predetermined "price" for an attempted purchase or transaction is meant to refer to a certain monetary amount to be transferred or paid out in a financial service transaction, or to a charge to be paid to a SOPP or other party for the purchase of other types of products and/or services.

In some embodiments, rating platform 400 may maintain a data set listing the various products and/or services offered by SOPP 500, or by various SOPPs supported by rating platform 400, along with their corresponding default list prices. Additionally, rating platform 400 may maintain a data set of alternative prices for certain of the products and/or services in accordance with applicable promotions and/or other price adjustment criteria. Alternatively, one or more of the pricing alternatives may be represented as a percentage discount from the default list price in a data set of rating platform 400. Rating platform 400 may also maintain a data set of supported Prepaid Accounts belonging to individual Subscribers, in association with information specific to each Prepaid Account, including records of promotions for which the Prepaid Account is, has been, or will be eligible, consumption history for the Prepaid Account, and/or Top-Up history for the Prepaid Account. In some embodiments, rating platform 400 may maintain its own data set(s) to store any or all of the above information, while in other embodiments, rating platform 400 may access any or all of the above information by querying data set(s) stored and/or maintained by one or more other entities, such as Operator 200, SOPP 500 and/or Facilitator 600. It should be appreciated that such information may be collected, stored, maintained and/or accessed in any suitable form using any suitable technique(s), as aspects of the present invention are not limited in this respect.

In some embodiments, upon receiving communication "B" from SOPP 500, rating platform 400 may use information transmitted in communication "B", including, for example, the Account ID and the product/service ID, to query its one or more data sets (or one or more data sets of one or more other entities, as described above) to determine the appropriate price for the current attempted transaction. For example, rating platform 400 may search for the Account ID in its dataset of Prepaid Accounts to determine any promotions that should be applied to the current attempted transaction. In some embodiments, whether a particular promotion is applicable may depend on the consumption and/or Top-Up history of the Prepaid Account (e.g., "Buy two horoscopes and get the third for half price"). A result of this query may in some embodiments be one or more applicable promotion IDs. Rating platform 400 may then determine the price of the attempted transaction by looking up the appropriate combination of the product/service ID, promotion ID(s) and any applicable timestamp information in its data set(s) of list prices, price adjustments and/or alternative or adjusted prices.

Having determined the price for the current attempted purchase, rating platform 400 may in some embodiments transmit a communication "C" to Prepaid Account 300, in an attempt to charge Prepaid Account 300 for the amount of the determined purchase price. Communication "C" may include the Account ID for identification of Prepaid Account 300 by the prepaid platform, any transaction ID and/or timestamp, as well as the determined purchase price. If rating platform 400 receives a response that sufficient funds exist in Prepaid Account 300 and the charge is successful, the transaction may continue in the conventional fashion as illustrated in FIG. 2. Conventionally, however, if it was determined that insufficient funds existed in Prepaid Account 300 for the attempted purchase, the purchase would be denied without further consideration. By contrast, some embodiments in accordance with the present invention provide further processing steps by which the attempted purchase may still be completed despite the occurrence of an Insufficient Balance Event.

Figure 5:
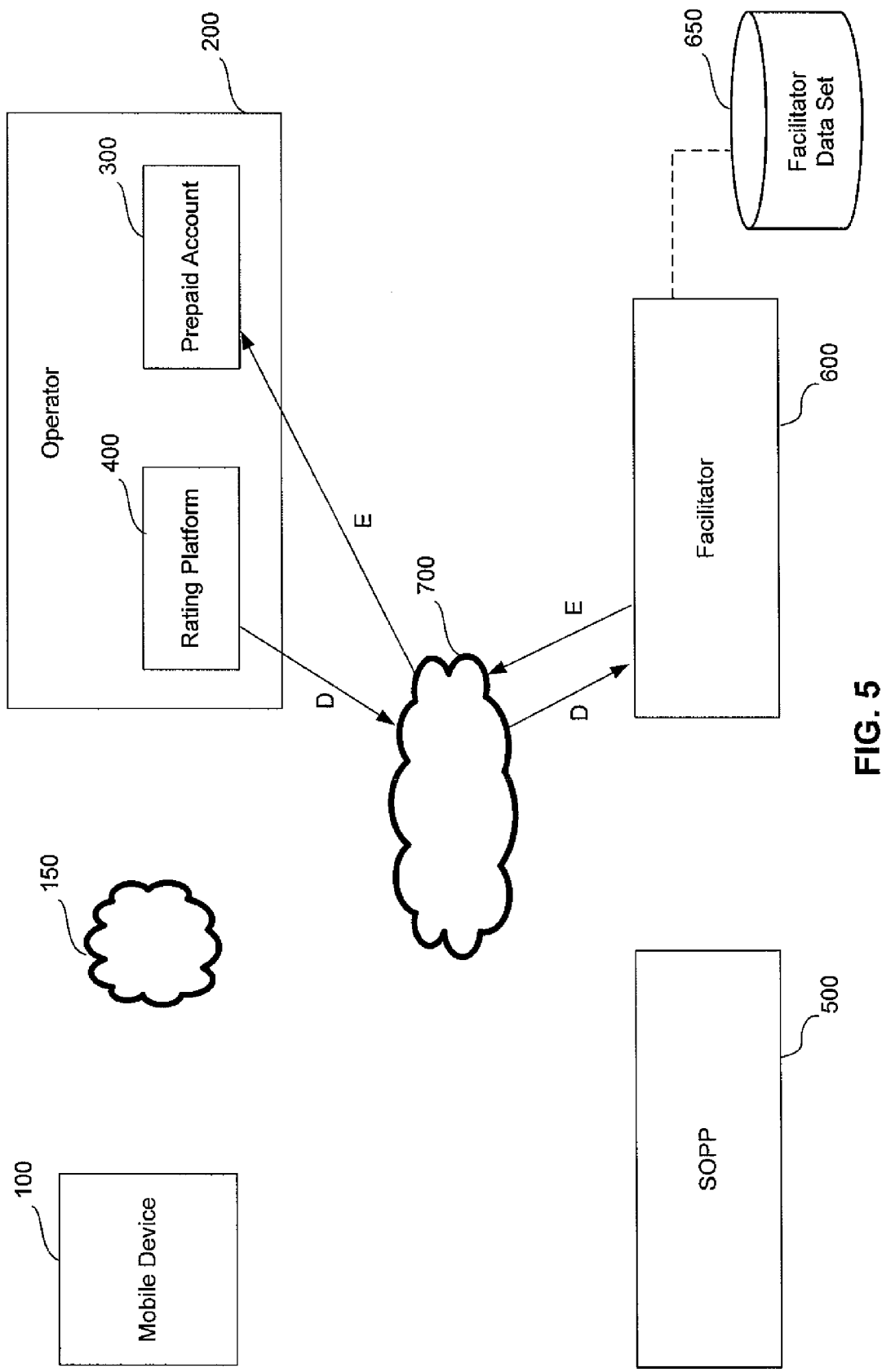

In some embodiments, if the response to communication "C" is that Prepaid Account 300 has insufficient funds (e.g., that the balance remaining in Prepaid Account 300 is less than the determined price of the attempted purchase—an Insufficient Balance Event), rating platform 400 may then transmit a communication "D" to Facilitator 600, as illustrated in FIG. 5. In some embodiments, communication "D" may include the Account ID, any transaction ID and/or timestamp, and the price for the attempted purchase. In some embodiments, communication "D" may also include a rating platform ID for rating platform 400, an Operator ID for Operator 200, the SOPP ID and/or the product/service ID for the current transaction, although it should be appreciated that aspects of the present invention are not limited to inclusion or exclusion of any of such information in communication "D". In some embodiments, Facilitator 600 may use information included in communication "D" to determine whether Prepaid Account 300 is eligible for a Facilitation (e.g., an Advance or Guarantee) to allow the current purchase to continue despite the insufficient balance in Prepaid Account 300.

Facilitator 600 may in some embodiments have access to a Facilitator data set 650 with stored information for various Prepaid Accounts, Subscribers of Prepaid Accounts, products/services and/or their associated SOPPs. Facilitator data set 650 may be implemented in any suitable way, including as one or more tangible, non-transitory computer-readable media encoded with data representing the stored information. Facilitator data set 650 may be integrated with Facilitator 600, included within, operatively connected to or otherwise accessible by one or more computing systems performing the functions of Facilitator 600 described herein. It should be appreciated that aspects of the present invention are not limited to any particular implementation of Facilitator data set 650.

In some embodiments, having received communication "D", Facilitator 600 may make a threshold determination, e.g., with reference to information stored in Facilitator data set 650, as to whether Prepaid Account 300, Operator 200, rating platform 400, SOPP 500 and/or the requested product and/or service are "provisioned" for DCO to be provided by Facilitator 600. Such entities and/or items may be provisioned for DCO, in some embodiments, by being identified in Facilitator data set 650 as being eligible for DCO, e.g., by setting a flag bit for the entity/item in the data set to indicate that it is provisioned. For example, in some embodiments, Operator 200 may be provisioned for DCO only if Operator 200 has entered into an agreement with Facilitator 600 to have DCO provided for Subscribers of Operator 200. Likewise, rating platform 400 may be provisioned for DCO by an agreement that rating platform 400 may transmit DCO requests to Facilitator 600. Similarly, in some embodiments, a charging platform and/or a billing platform may be provisioned for DCO through an agreement to transmit DCO requests to Facilitator 600. In some embodiments, Prepaid Account 300 may be provisioned for DCO if the Subscriber has entered into a DCO agreement or has not opted out of DCO, if the Subscriber is not blacklisted, if the Subscriber's credit history and/or Top-Up history meet certain criteria, if the Prepaid Account does not have any previous Facilitations (or more than a certain number of previous Facilitations) that have not yet been recovered, if the Prepaid Account is not over its credit limit, and/or if the Prepaid Account has had a Top-Up performed recently. In some embodiments, a Subscriber (and therefore the Subscriber's Prepaid Account) may not be eligible for DCO if there has not been at least one Top-Up to the Prepaid Account within a certain recent period of time, such as within the last thirty days ("recency"). Certain SOPPs may be provisioned for DCO while other SOPPs are not; for example, in some embodiments, SOPPs providing gambling or adult entertainment products and/or services may not be eligible for DCO by Facilitator 600. Other SOPPs may not be provisioned for DCO due to lack of an agreement with an Operator, rating platform or Facilitator to have their products and/or services eligible for DCO. In addition, certain products, services and/or categories of products and/or services may be eligible for DCO while others are not, regardless of whether the providing SOPP is provisioned, in accordance with any suitable criteria established by Facilitator 600, Operator 200, rating platform 400, SOPP 500 and/or any other party. In some embodiments, whether an attempted purchase is provisioned for DCO may be dependent on the price determined for the purchase; for example, DCO may be provisioned only for purchases with prices lower (or higher) than a certain threshold.

Certain Subscribers and/or their Prepaid Accounts may be identified in the Operator's and/or Facilitator's database(s) as not eligible to receive a Facilitation. For example, there may be insufficient information (history) on the Subscriber/Prepaid Account; or the Subscriber/Prepaid Account may be identified on a so-called "black list" for any number of reasons such as poor past performance or government mandate (anything from a government agency not allowing its User Accounts to be used for on-line purchases to executive or court orders barring certain Users from such activity, for example); or the Subscriber may be identified as likely churning accounts (i.e., switching Operators or accounts frequently) and thus may be a bad debt risk; or the Subscriber may simply have opted out of DCO. In some embodiments, threshold sufficient information to qualify a Prepaid Account as Facilitation-eligible may include a history of some number of months' service prior to the current request, during which there have been some minimum number of Account recharges (topping-ups) and/or consumption events (i.e., purchase transactions). In some embodiments, a further criterion may be the amount of the Facilitation; for example, whether it exceeds some maximum monetary amount (absolutely or in relation to the price of the product or service, for example), or a maximum credit amount by amount of concurrency. All of the above may be fixed or algorithmically determined.

In some embodiments, if Facilitator 600 determines that the transaction corresponding to communication "D" is not provisioned for DCO based on any of the criteria described above, and/or based on any other suitable criteria, Facilitator 600 may notify rating platform 400, Operator 200 and/or SOPP 500 that the transaction is not authorized, and a rejection notification may be provided to Mobile Device 100. In some embodiments, Facilitator 600 may notify one or more other parties of the reason(s) for the rejection. If, however, Facilitator 600 determines that the transaction is initially provisioned for DCO in general, in some embodiments Facilitator 600 may proceed to determine whether to offer a Facilitation to the User for that particular transaction, based on a maximum Facilitation amount allowed for Prepaid Account 300. For example, in some embodiments Facilitator data set 650 may store a maximum allowed Facilitation amount for each Prepaid Account provisioned for DCO, based on scoring criteria for the Prepaid Account that will be described below. If the determined price for the current attempted purchase is less than or equal to the maximum allowed Facilitation amount stored in Facilitator data set 650 for Prepaid Account 300 (or for the Subscriber of Prepaid Account 300), then Facilitator 600 may determine that a Facilitation will be offered and/or provided to the User of Mobile Device 100. However, if the determined price is more than the maximum allowed Facilitation amount, Facilitator 600 may notify one or more other parties that the transaction is not authorized, and may in some embodiments transmit specific notification of the reason(s) for rejection.

Figure 6:
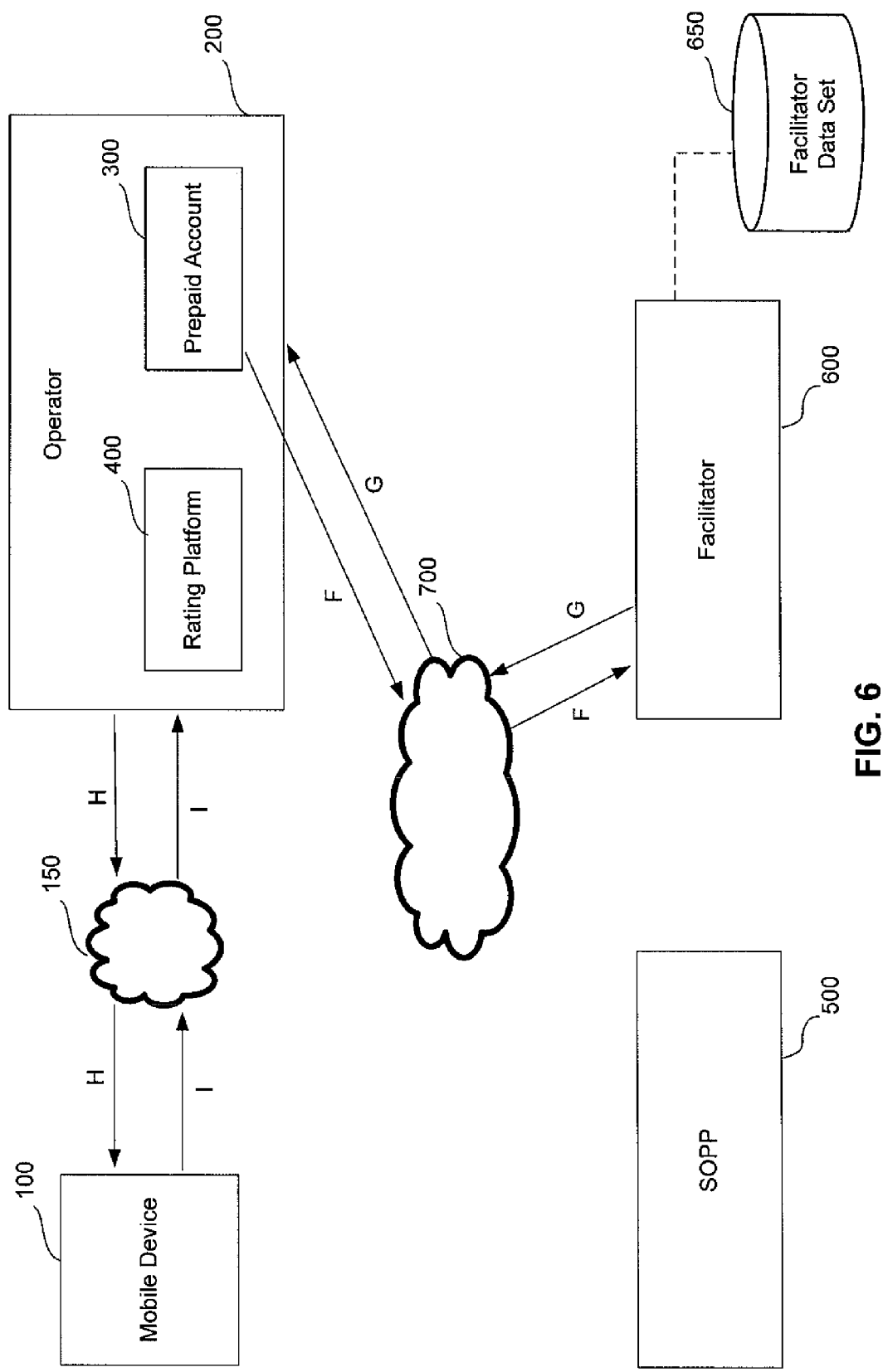

In some embodiments, if Facilitator 600 determines to authorize a Facilitation for the current attempted purchase, Facilitator 600 may proceed directly to offer the Facilitation through communication "G", or to authorize release of the product and/or service through communication "J", as will be described below. However, in some embodiments, Facilitator 600 may first attempt to determine if there is any remaining balance in Prepaid Account 300. In some embodiments, the remaining balance in Prepaid Account 300 and/or an amount of insufficiency of Prepaid Account 300 with respect to the current attempted transaction may have been provided to Facilitator 600 by rating platform 400 in communication "D" (e.g., rating platform 400 may have learned the remaining balance and/or the amount of insufficiency from Prepaid Account 300 in communication "C", in some embodiments). However, in other embodiments, communication "D" may only include the predetermined price of the attempted purchase, without mention of the remaining balance or the amount of insufficiency of Prepaid Account 300. Facilitator 600 may therefore transmit communication "E" to directly query Prepaid Account 300, e.g., through network 700, as illustrated in FIG. 5. In some embodiments, communication "E" may include the Account ID, any transaction ID and/or timestamp, the purchase price and/or the product/service ID. In response to communication "E", the prepaid platform managing Prepaid Account 300 may transmit communication "F" back to Facilitator 600, as illustrated in FIG. 6. Communication "F" may also include the Account ID and/or any transaction ID and/or timestamp.

In some embodiments, communication "E" may be transmitted in a form that indicates a request to debit or reserve the full amount of the purchase price from Prepaid Account 300. In this case, if there is insufficient balance in Prepaid Account 300, the response "F" may merely indicate that the debit or reserve attempt failed. Facilitator 600 may then determine the Facilitation amount to be the entire purchase price. Facilitator 600 may compare this Facilitation amount (in this case, the entire purchase price) to the maximum allowed Facilitation amount for Prepaid Account 300, and, if the Facilitation amount is less than the maximum allowed Facilitation amount, Facilitator 600 may proceed to authorize the attempted purchase through communication "G".

In other embodiments, communication "E" may be transmitted in a form that indicates a request to debit from Prepaid Account 300 the largest possible amount that is less than or equal to the purchase price. In this case, the response "F" may indicate the amount that was able to be debited, e.g., the balance that was previously remaining in Prepaid Account 300. In yet other embodiments, communication "E" may be transmitted in a form that indicates a request to reserve in Prepaid Account 300 the largest possible amount that is less than or equal to the purchase price. In this case, the response "F" may indicate the amount that was able to be reserved for the current transaction, but has not yet been debited from Prepaid Account 300.

In some embodiments, when Facilitator 600 is able to determine from communication "F" what the actual remaining balance in Prepaid Account 300 is, Facilitator 600 may then calculate an amount of insufficiency of Prepaid Account 300 with respect to the current attempted purchase. For example, Facilitator 600 may determine the amount of insufficiency by subtracting the remaining balance from the purchase price, and may determine the Facilitation amount to be equal to the amount of insufficiency. In other embodiments, the prepaid platform may compute the amount of insufficiency and include this information in communication "F", and Facilitator 600 may take this amount to be the Facilitation amount. In still other embodiments, as described above, the remaining balance and/or the amount of insufficiency may have been transmitted to Facilitator 600 by rating platform 400 in communication "D". In such embodiments in which the amount of insufficiency can be determined, Facilitator 600 may compare the amount of insufficiency to the maximum allowed Facilitation amount for Prepaid Account 300 to determine whether to authorize a Facilitation for the current transaction, rather than or in addition to the earlier described act of comparing the entire purchase amount to the maximum allowed Facilitation amount.

Thus, in various embodiments Facilitator 600 may determine a Facilitation amount for the current transaction, e.g., the amount of funds that Facilitator 600 will either guarantee or advance to Prepaid Account 300 to allow the attempted purchase to be completed. In some embodiments and in some cases, the Facilitation amount may be the entire purchase price, regardless of whether Prepaid Account 300 is completely depleted or has some remaining balance less than the purchase price. In some embodiments, when Facilitator 600 is able to determine from communication "D" or communication "F" what balance is remaining in Prepaid Account 300, the Facilitation amount may be the amount of insufficiency of Prepaid Account 300 with respect to the purchase price, e.g., the difference between the purchase price and the remaining balance of Prepaid Account 300. In some embodiments, however, Facilitator 600 may determine the Facilitation amount to be equal to the full purchase price or to any other suitable amount, even if the remaining balance in Prepaid Account 300 can be determined. In some embodiments, the Facilitation amount may be an estimated amount, which may be higher than the final transaction price, and may not be used up in its entirety in the current transaction, in which case the remainder may be at the User's disposal for other future transactions.

In some embodiments, as described above, a Handshake Interaction may be undertaken to offer a Facilitation to the User of Mobile Device 100 and allow the User to accept the Facilitation. To initiate the Handshake Interaction, Facilitator 600 may transmit a communication "G" to Operator 200, as illustrated in FIG. 6. Communication "G" may include the Account ID, any transaction ID and/or timestamp, as well as an indication that a Facilitation is offered in connection with the current transaction. In some embodiments, communication "G" may also include the Facilitation amount being offered. Additionally, in some embodiments communication "G" may also include the amount of any Facilitation Fee to be charged for the Facilitation. However, in other embodiments, the amount of a standard Facilitation Fee may be known to Operator 200, such that it need not be included in communication "G".

Figure 7:
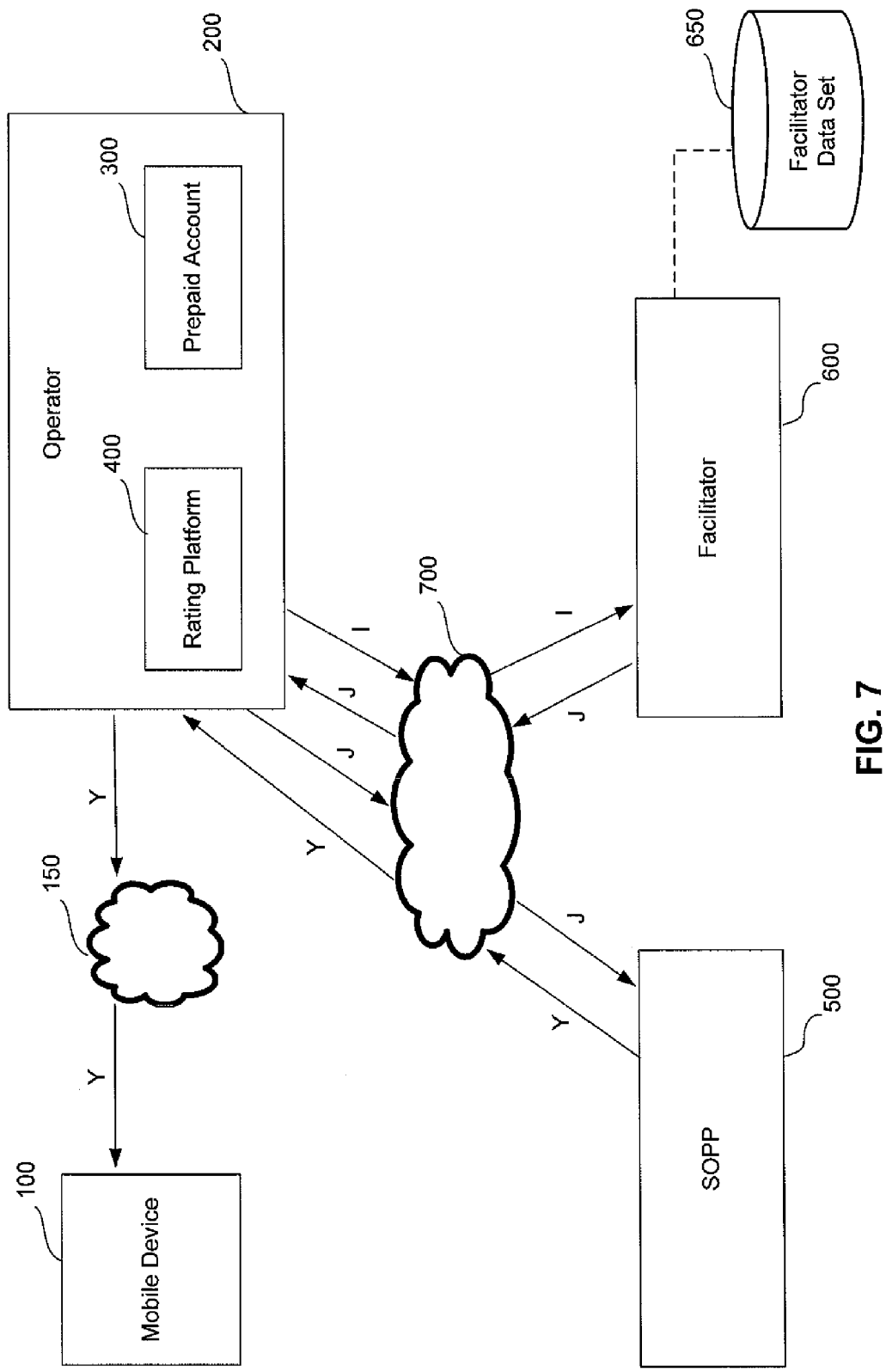

Upon receiving communication "G", Operator 200 may transmit communication "H" to Mobile Device 100 to inform the User of the offer of the Facilitation. Communication "H" may include the Account ID and any transaction ID and/or timestamp for the transaction. In some embodiments, communication "H" may be a text or voice message that simply informs the User that a Facilitation is offered, and requests affirmative acceptance of the offer. In other embodiments, communication "H" may also inform the User of the Facilitation amount being offered, and may inform the User of the amount of any Facilitation Fee involved. If the User does not wish to accept the offer, in some embodiments the User may simply do nothing, and the transaction may end. In other embodiments, the User may reject the offer by sending a suitable reply to Operator 200. If the User does wish to accept the offer, in some embodiments the User, through Mobile Device 100, may transmit communication "I" to Operator 200. Communication "I" may include the Account ID and any transaction ID and/or timestamp, as well as an indication that the Facilitation offer is accepted by the User. Operator 200 may then relay communication "I" to Facilitator 600, as illustrated in FIG. 7. It should be appreciated that Operator 200 may relay communication "I", or any other communication described herein as being relayed by Operator 200 or transmitted through Operator 200, in unchanged form, or may modify or re-package the communication in any suitable way while preserving information required at its destination, as aspects of the present invention are not limited in this respect.

In some embodiments, Facilitator 600 may proceed to authorize the attempted purchase once communication "I" is received and the Handshake Interaction is completed. In other embodiments, as discussed above, the Subscriber of Prepaid Account 300 may have entered into a subscription-like agreement to have Facilitations automatically provided in response to Insufficient Balance Events, without the need for a Handshake Interaction. In some further embodiments, such as the Opt-Out Subscription discussed above, Facilitations may be provided automatically by default, unless a User or Subscriber instructs the Operator or Facilitator to remove the automatic Facilitation service from the associated Prepaid Account. In such automatic Facilitation cases, communications "G", "H" and "I" may be omitted. However, in some embodiments, Facilitator 600 and/or Operator 200 may still transmit a notification of the Facilitation to the User of Mobile Device 100, even if Prepaid Account 300 is provisioned for automatic Facilitation.

In some embodiments, authorization of the attempted purchase may be initiated through communication "J", which may serve as an authorization message transmitted from Facilitator 600, through Operator 200, to SOPP 500, e.g., through network 700, as illustrated in FIG. 7. Alternatively, in some embodiments, communication "J" may be transmitted directly from Facilitator 600 to SOPP 500 through network 700. Communication "J" may include the Account ID, any transaction ID and/or timestamp, and an authorization to release the requested product and/or service for the current transaction to Mobile Device 100, and in some embodiments may also include the product/service ID for the requested product and/or service. Alternatively, in some embodiments SOPP 500 may have recorded the transaction ID (or Account ID and timestamp) and the product/service ID from previous communications in the transaction, such that SOPP 500 can identify the requested product and/or service without need for including the product/service ID in communication "J". In some embodiments, authorization message "J" may serve as a session-extension message or an inhibition of a session-termination message, to allow the current transaction session to continue without being cut off due to the Insufficient Balance Event. SOPP 500 may then transmit the purchased product and/or service to Mobile Device 100 through Operator 200 in communication "Y". Alternatively, if SOPP 500 previously transmitted the product and/or service to Operator 200 (whether or not in connection specifically with the current attempted transaction), and Operator 200 has been holding the product and/or service pending authorization of the Facilitation, Operator 200 may then transmit the purchased product and/or service to Mobile Device 100 in communication "Y", without contacting SOPP 500.

Figure 8:
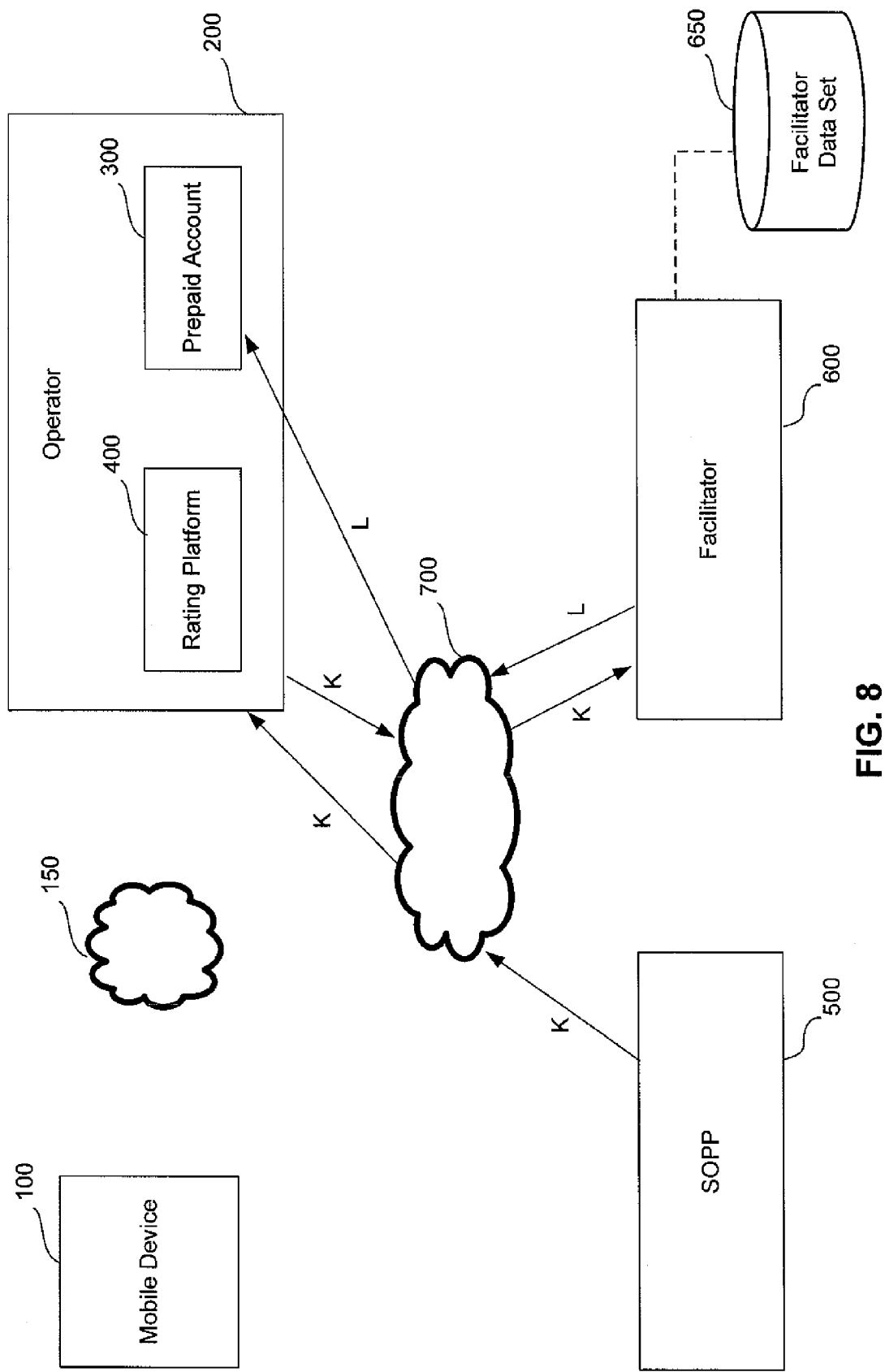

In some embodiments, SOPP 500 may confirm that the product and/or service was successfully released to Mobile Device 100 by transmitting communication "K" to Facilitator 600 (e.g., through network 700 and Operator 200, or directly through network 700), as illustrated in FIG. 8. Communication "K" may include the Account ID and any transaction ID and/or timestamp for the current transaction, as well as a confirmation indication. Alternatively or additionally, in some embodiments Operator 200 may provide confirmation to Facilitator 600 that the purchase was completed.

In some embodiments, Facilitator 600 may then transmit communication "L", including the Account ID and any transaction ID and/or timestamp, to the prepaid platform managing Prepaid Account 300. For example, if a remaining balance in Prepaid Account 300 was reserved in response to communication "E", but not yet debited, communication "L" may include a request to proceed to debit the reserved funds from Prepaid Account 300. If some error occurs in the process such that the product and/or service is not in fact released to Mobile Device 100, communication "L" may include an indication to cancel the reservation of funds made earlier, and return the funds to normal (unreserved) status in Prepaid Account 300. If the product and/or service was successfully released and the Facilitation offered is an Advance, communication "L" may perform a transfer of funds equal to the Facilitation amount from Facilitator 600 to Prepaid Account 300, and those funds may then be debited from Prepaid Account 300 on behalf of SOPP 500. Such a transfer of funds may be implemented in any suitable way, as aspects of the present invention are not limited in this respect. In some embodiments, the "funds" transferred from Facilitator 600 to Prepaid Account 300 may be in the form of service credits, such as a number of SMS message credits, rather than monetary funds, although such service credits may have intrinsic monetary value equivalent to the Facilitation amount. However, if the Facilitation offered is a Guarantee, Facilitator 600 may not initially transfer any funds to Prepaid Account 300, but may simply have an agreement to guarantee the Facilitation amount to Operator 200 and/or SOPP 500, in the event that the Facilitation amount is not later recovered from a User of Mobile Device 100. In some embodiments, whether the Facilitation offered is an Advance or a Guarantee, Facilitator 600 may record the Facilitation amount advanced or guaranteed (and the amount of any Facilitation Fee applied), for example in Facilitator data set 650 in association with Prepaid Account 300 and/or the Subscriber of Prepaid Account 300, for subsequent recovery from a Top-Up operation or other source.

While FIGS. 4 through 8 illustrate an exemplary DCO operation with respect to a "pull" transaction, it should be appreciated that similar processes may be undertaken with respect to a "push" transaction. For example, an exemplary "push" transaction may encompass all of the acts described above with the exception of communication "A" from Mobile Device 100 to initiate the purchase. In some embodiments, a "push" transaction may begin with communication "B" from SOPP 500 initiating a "push" of a particular product and/or service. In other embodiments, a "push" transaction may begin with a communication from Operator 200 to SOPP 500, prior to communication "B", to request that SOPP 500 proceed with a "push" transaction initiated by Operator 200.

For instance, instead of a User initiating the above "insufficient funds" transaction, it is also possible for a SOPP to initiate a transaction in which a product or service will be delivered to the User only if there are sufficient funds in the Subscriber's Prepaid Account to cover any resulting charges. For example, a Subscriber may sign up with a SOPP for a subscription service wherein the SOPP sends the User messages when certain predetermined events occur (e.g., a stock hits a certain price or a favorite sports team trades a player), for a charge. Then either (1) the SOPP may query the Operator to ascertain if there are sufficient funds in the Subscriber's Account prior to sending the subscription content or (2) prior to sending the content to the User the Operator may check the Subscriber's Account and hold the subscription content and deliver it only after a sufficient Facilitation has been received, or discard the subscription content if such Facilitation is not received. In another example, the Operator may store the subscription content, may ascertain whether the Subscriber's Account has sufficient funds for each delivery of the subscription content, and may query a Facilitator for Facilitations before delivering such content if an Insufficient Balance Event occurs. The Operator may then inform the SOPP of which of these "push" transactions were successful at predetermined intervals (e.g., monthly).

Figure 9:
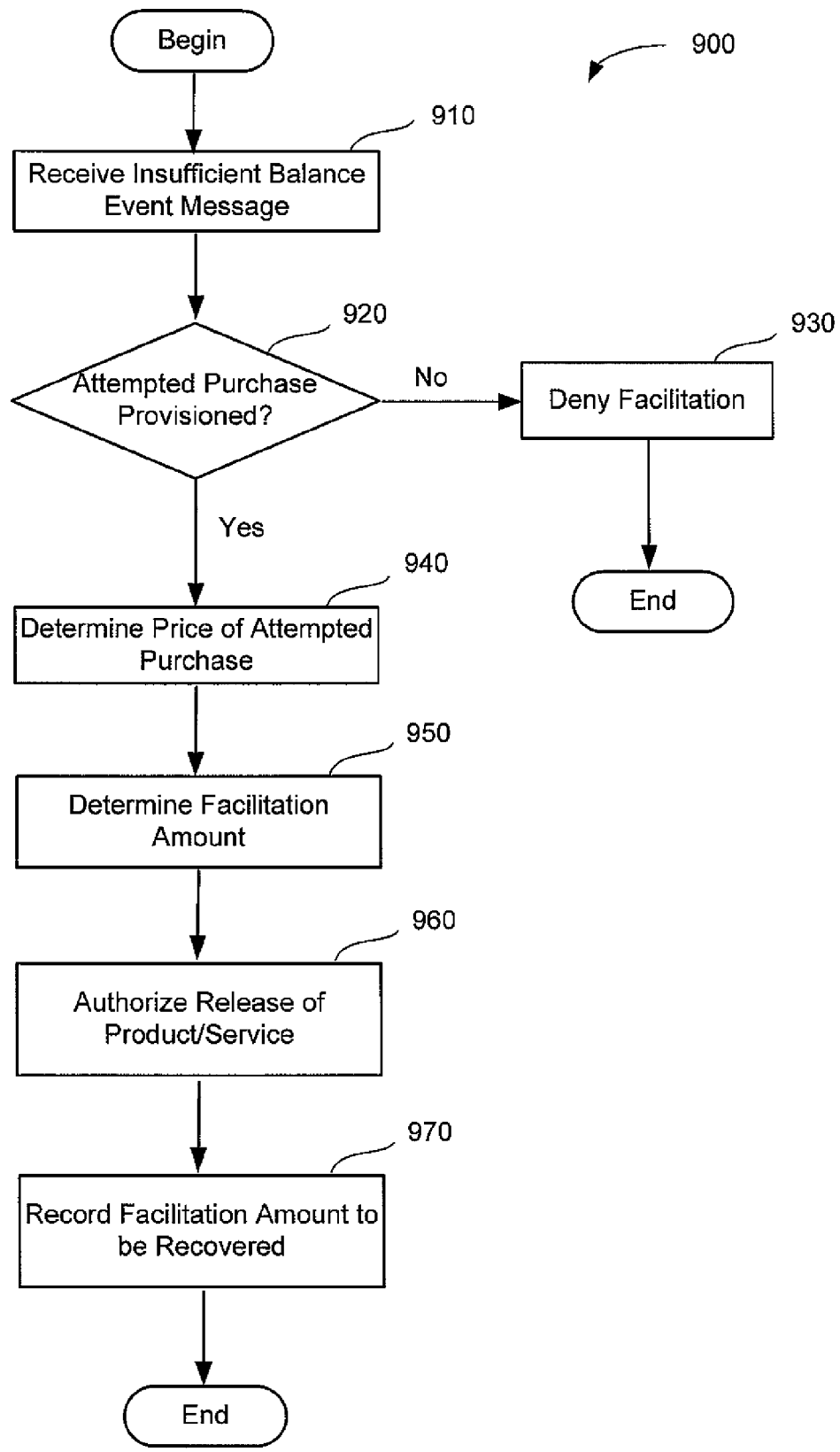
FIGS. 9 and 10 are flow diagrams summarizing the DCO processes illustrated in FIGS. 4 to 8.

In summary, FIG. 9 illustrates an exemplary method 900 for performing Data Completion Online (DCO) to facilitate a purchase of a product and/or a service via a Prepaid Account associated with a Mobile Device, in accordance with some embodiments of the present invention. Method 900 may be performed by a Facilitator, such as Facilitator 600; as discussed above, however, functions of a Facilitator may be performed by an Operator, a SOPP or a third party service.

Method 900 begins at act 910, at which an Insufficient Balance Event message may be received. As described above, an exemplary Insufficient Balance Event message is communication "D" transmitted by rating platform 400 to Facilitator 600. In other examples, an Insufficient Balance Event message may be received from an Operator or directly from a Prepaid Account platform or a rating platform. In some embodiments, an Insufficient Balance Event message may include an Account ID for the Prepaid Account associated with the Mobile Device through which the purchase is being attempted, and an identification of the product/service desired to be purchased. In some embodiments, the Insufficient Balance Event message may also include further information, such as an Operator ID, a rating platform ID, a SOPP ID, a timestamp, a predetermined price for the attempted purchase, a remaining balance in the Prepaid Account and/or an amount of insufficiency of the Prepaid Account with respect to the attempted purchase.

At act 920, a determination may be made, based on information received with the Insufficient Balance Event message, as to whether the attempted purchase is provisioned for DCO. In some embodiments, the attempted purchase may not be provisioned (i.e., eligible) for DCO if one or more of the Operator, the rating platform, the SOPP, the product/service, the Subscriber or User or the Prepaid Account itself is not currently (or as of the timestamp of the current attempted purchase) provisioned for DCO according to records and/or other data maintained and/or accessed by the Facilitator. In some embodiments, the attempted purchase also may not be provisioned for DCO if its predetermined price is outside of a range of prices provisioned for DCO, either in general or for the specific Operator, rating platform, SOPP, product/service or Prepaid Account of the current attempted purchase, or any combination of those variables. In some embodiments, if it is determined that the attempted purchase is not provisioned for DCO for any reason, the Facilitation may be denied at act 930 and the method may end. In some embodiments, denying Facilitation may include transmission of a denial communication, which may or may not include reason(s) for denial.

If it is determined that the attempted purchase is provisioned for DCO, method 900 may continue to act 940, at which the price of the attempted purchase may be determined. In some embodiments, as described above, a predetermined price for the attempted purchase may be included in the Insufficient Balance Event message, e.g., as determined by the rating platform. In such embodiments, the price may be determined at the Facilitator with reference to the information in the Insufficient Balance Event message. In other embodiments, however, the Insufficient Balance Event message may not specify a price for the attempted purchase. For example, in some embodiments a separate rating platform may not be present, and the Facilitator may perform functions of the rating platform described above to determine the price of the attempted purchase at act 940. The price may be determined with reference to any suitable number and/or type of factors, including, but not limited to, the Account ID, the Operator ID, the SOPP ID, the product/service ID, any applicable promotions, top-up history and/or consumption history of the Prepaid Account, and/or the timestamp of the attempted purchase, including the date, day of the week, and/or time of day of the attempted purchase.

At act 950, a Facilitation amount may be determined based on the price determined at act 940 for the attempted purchase. In some embodiments, the Facilitation amount may be determined to be equal to the determined price for the attempted purchase. In other embodiments, the Facilitation amount may be determined to be equal to the amount of insufficiency of the Prepaid Account with respect to the attempted purchase. In still other embodiments, the Facilitation amount may be determined to be any amount sufficient to allow the attempted purchase to be completed without requiring the User of the Mobile Device to Top-Up the Prepaid Account first, and may in some cases be higher than the price. In some embodiments, whether the Facilitation amount is determined based on an amount of insufficiency of the Prepaid Account may depend on whether the amount of insufficiency can be determined from any transmission from and/or query to the Prepaid Account. However, in some embodiments, the Facilitation amount may be determined without reference to the amount of insufficiency, even if the amount of insufficiency can be determined (for example, in some embodiments, the Facilitation amount may always be determined to be equal to the entire price of the attempted purchase, regardless of the remaining balance in the Prepaid Account).

At act 960, release of the product and/or service to the requesting Mobile Device may be authorized. In some embodiments, this authorization may be given without requiring a Top-Up of the Prepaid Account prior to the release of the product and/or service to the Mobile Device. As discussed above, in some embodiments this release of the product and/or service may be arranged on the basis of a Facilitation provided to the Prepaid Account, and this Facilitation may be in the form of an Advance or a Guarantee. In the case of an Advance, the Facilitator may make a transfer of funds equal to the Facilitation Amount to the Prepaid Account. In the case of a Guarantee, the Facilitator may not immediately transfer funds to the Prepaid Account, but may guarantee the Facilitation Amount to the Operator and/or SOPP in the event that the Facilitation Amount is not later successfully recovered from the Prepaid Account.

Method 900 ends at act 970, at which the Facilitation Amount may be recorded in a computer memory or other computer-readable storage medium, to be recovered from the Prepaid Account at a later time, after the release of the product and/or service. In some embodiments, the Facilitation Amount may be recovered from the next Top-Up performed by a User of the Prepaid Account. In the case of an Advance, such recovery may involve one or more transfers of funds from the Topped-Up Prepaid Account to the Facilitator as reimbursement for the Facilitation Amount advanced. The status of the recorded Facilitation Amount may then be updated to reflect the successful recovery, e.g., by updating the status from "pending" to "recovered". In the case of a Guarantee, recovery may involve updating the status of the recorded Facilitation Amount without transferring funds to the Facilitator. The Facilitation Amount may be debited from the Topped-Up Prepaid Account to pay the Operator and/or SOPP for the product and/or service released based on the Guarantee.

Figure 10:
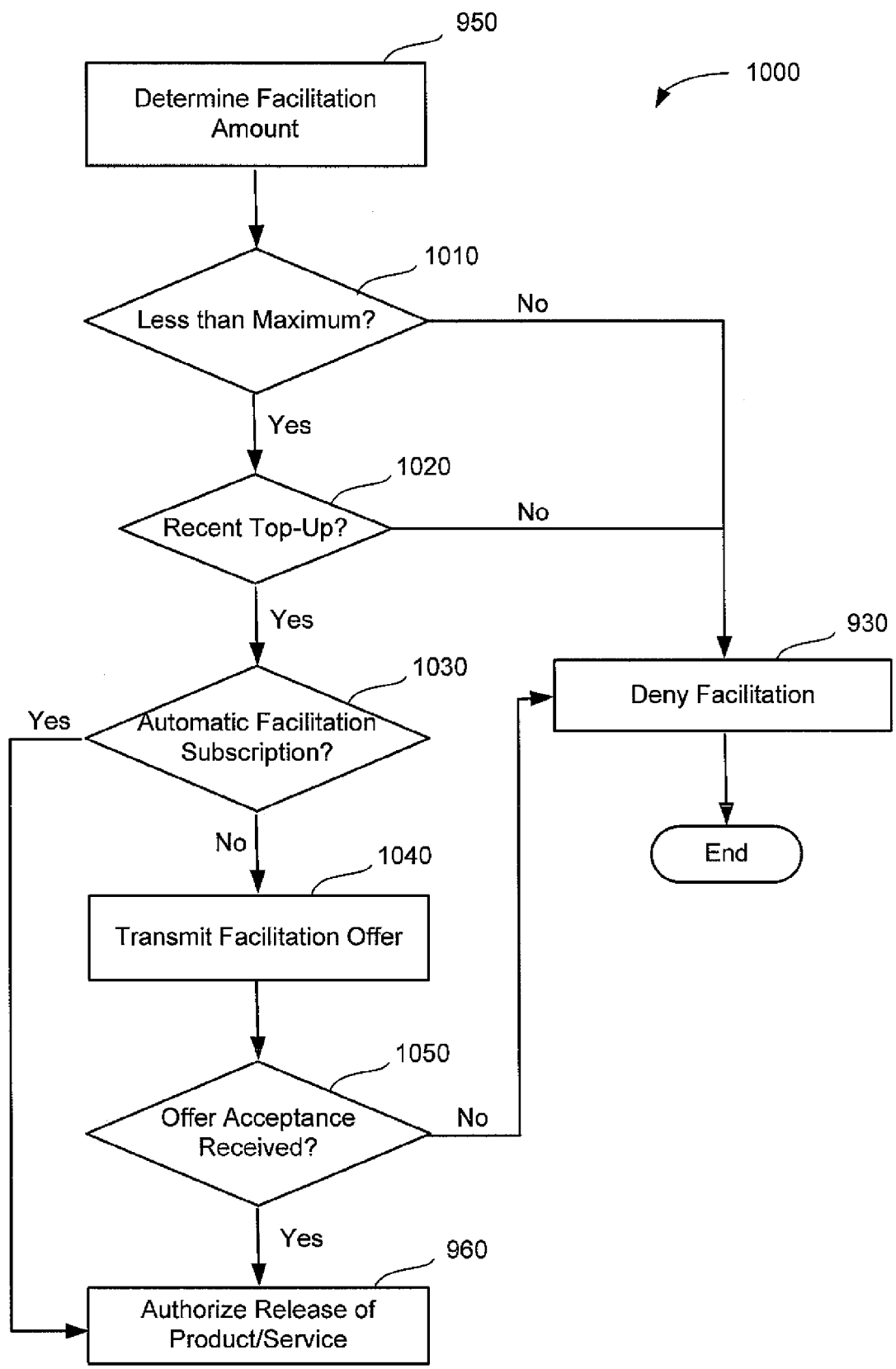

FIG. 10 illustrates in greater detail a method 1000 that may be performed as part of method 900, e.g., between acts 950 and 960 of method 900, in the process of facilitating a purchase of a product and/or a service via a Prepaid Account associated with a Mobile Device, in accordance with some embodiments of the present invention.

Once the Facilitation Amount has been determined at act 950, the Facilitation Amount may be compared at act 1010 with a maximum allowed Facilitation amount stored for the Prepaid Account in records maintained, and/or accessible, by the Facilitator. Such a maximum allowed Facilitation amount may be defined for the Prepaid Account based on suitable scoring criteria for the Prepaid Account, examples of which are described below. In some embodiments, if the determined Facilitation amount is greater than the maximum allowed Facilitation amount for the Prepaid Account, method 1000 may end at act 930 with denial of the Facilitation.

If the determined Facilitation Amount is less than or equal to the maximum allowed Facilitation amount, method 1000 may proceed to act 1020, at which it may be determined whether the Prepaid Account has been Topped-Up recently. In some embodiments, if it is determined that the most recent Top-Up to the Prepaid Account was not performed recently enough, method 1000 may end at act 930 with denial of the Facilitation. (Recency of Top-Up may also in some embodiments be among the criteria for provisioning considered at act 920.) In this way, Facilitations may only be provided to Prepaid Accounts with a Top-Up history that indicates that Facilitations are likely to be recovered within an acceptable time frame. In some embodiments, Facilitation may be denied if the Prepaid Account has not been Topped-Up within a certain recent period, such as the last thirty days. It should be appreciated that any suitable time period may be used to define a "recent" Top-Up, as aspects of the present invention are not limited in this respect.

If it is determined at act 1020 that the Prepaid Account has been Topped-Up recently enough to be eligible for Facilitation, method 1000 may proceed to act 1030, at which it may be determined whether the Prepaid Account has been subscribed for automatic Facilitation. If, for example, the Subscriber of the Prepaid Account has entered into an agreement with the Operator, SOPP and/or Facilitator to have Facilitations automatically applied to the Prepaid Account to facilitate attempted purchases where applicable, method 1000 may proceed directly to act 960 at which release of the product and/or service may be authorized, without first performing a Handshake Interaction. If, however, no agreement or subscription for automatic facilitation has been entered for the Prepaid Account, method 1000 may continue to act 1040, at which a Facilitation offer may be transmitted to the Mobile Device.

As described above, an example of a Facilitation offer is communication "G" transmitted by Facilitator 600 to Mobile Device 100 (e.g., relayed by Operator 200 as communication "H"). Such a Facilitation offer communication may indicate that a Facilitation is offered in connection with the attempted purchase of the current transaction. In some embodiments, the Facilitation offer may also indicate the Facilitation amount being offered and/or the amount of any Facilitation Fee that would be charged for the Facilitation. The User of the Mobile Device may then be given an opportunity to accept or reject the Facilitation offer as part of the Handshake Interaction.

At act 1050, a determination may be made as to whether the User of the Mobile Device accepts the Facilitation offer. As described above, in some embodiments the User may indicate acceptance of the Facilitation offer by transmitting an acceptance communication (e.g., communication "I") from the Mobile Device to the Facilitator (e.g., routed through the Operator platform). If such offer acceptance is not received, method 1000 may end at act 930 with denial of the Facilitation. If User acceptance of the Facilitation offer is received, method 1000 may continue to act 960, at which release of the product and/or service may be authorized, as described above with reference to FIG. 9.

Figure 11:
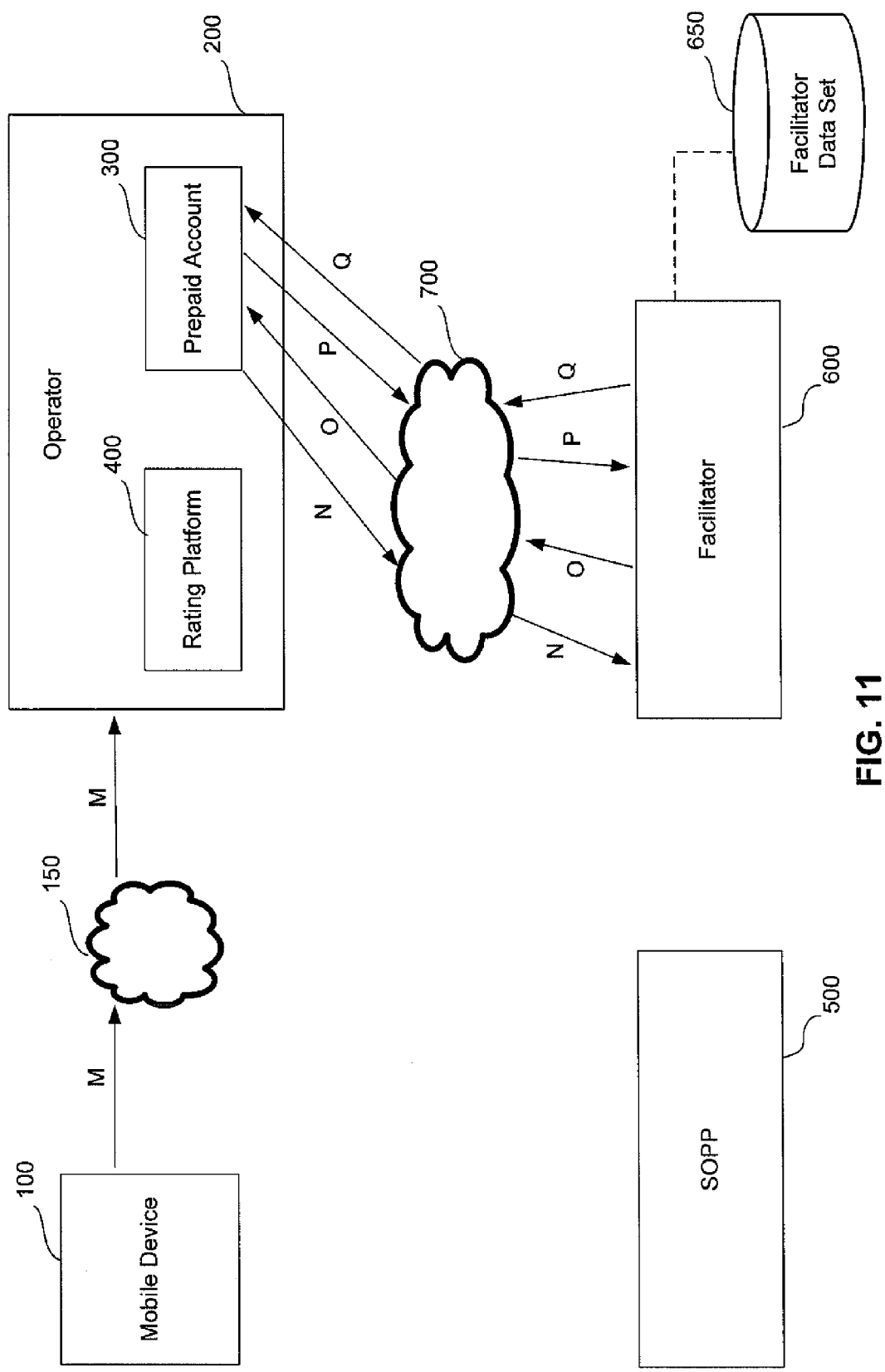
FIG. 11 illustrates the parties to a recovery process and the flow of information between the parties subsequent to a "Data Completion Online" (DCO) process according to some exemplary embodiments of the present invention.

FIG. 11 illustrates the parties, and the flow of information between the parties, in an exemplary recovery process to recover a Facilitation amount previously advanced or guaranteed by Facilitator 600 for Prepaid Account 300, in accordance with some embodiments of the present invention. The scenario of FIG. 11 assumes that a Facilitation has previously been provided by Facilitator 600 in connection with Prepaid Account 300, to cover an attempted purchase by a User of Mobile Device 100 in response to an Insufficient Balance Event, and that the Facilitation amount has been recorded by Facilitator 600, for example in Facilitator data set 650.

At some point subsequent to the completion of the transaction in which the Facilitation was provided, a User of Mobile Device 100 (who may be the same or a different User from the User for whom the Facilitation was provided) may Top-Up or otherwise replenish funds in Prepaid Account 300 by transmitting a Top-Up communication "M" from Mobile Device 100 to Operator 200, e.g., through network 150. Alternatively, such a Top-Up or other type of funds may be provided to Prepaid Account 300 by a third party other than a User of Mobile Device 100.

In some embodiments, the prepaid platform managing Prepaid Account 300 may notify Facilitator 600 of the Top-Up immediately upon receiving Top-Up communication "M", by transmitting notification communication "N" to Facilitator 600, e.g., through network 700. Alternatively, in some embodiments communication "N" may be transmitted as one of a series of periodic notification communications indicating any Top-Ups that have occurred in the time since the most recent notification communication. In one example, the prepaid platform may send Facilitator 600 a list every five minutes of the Top-Up amounts and Account IDs of all Top-Ups that have occurred on the prepaid platform in the last five minutes. In some embodiments, such a list may include Top-Ups for all Prepaid Accounts on the platform, while in other embodiments, the list may include only Top-Ups for Prepaid Accounts that are provisioned for DCO or that have pending Facilitations to recover. In other embodiments, Facilitator 600 may periodically query the prepaid platform for Top-Up events in relation to Subscribers/Accounts with pending Facilitation debt. In some embodiments, the prepaid platform may quarantine all or part of a Top-Up immediately after it is received at Prepaid Account 300, such that the added funds cannot be withdrawn from the Account, until the prepaid platform receives notification from Facilitator 600 as to whether funds should be debited from the Top-Up to pay for a pending Facilitation previously provided to Prepaid Account 300.

In some embodiments, Facilitator 600 may compare the Top-Up notification information from communication "N" with information stored in Facilitator data set 650, to determine that Prepaid Account 300, which has a pending Facilitation to recover, has had a Top-Up performed or some other replenishment of funds. Facilitator 600 may determine the Facilitation amount to recover, based on records stored in Facilitator data set 650. Facilitator 600 may then transmit communication "O" to the prepaid platform to charge Prepaid Account 300 for recovering the Facilitation amount.

If the Top-Up results in Prepaid Account 300 having a new balance greater than or equal to the Facilitation amount (plus any applicable Facilitation Fee), communication "O" may charge Prepaid Account 300 for the entire Facilitation amount (possibly plus a Facilitation Fee). In some embodiments, if the Facilitation was an Advance, the charge may result in the Facilitation amount (possibly plus a Facilitation Fee) being debited from Prepaid Account 300 on behalf of Facilitator 600, while if the Facilitation was a Guarantee, the charge may result in the Facilitation amount being debited on behalf of SOPP 500 and/or Operator 200. In some embodiments, any Facilitation fee may be charged to the Prepaid Account (e.g., to be paid by the Subscriber or other User accessing the Prepaid Account), while in other embodiments, Facilitation fees may be logged to be charged to the Operator, to the SOPP, and/or to a third party, such as a Sponsor. Facilitator 600 may then update the status of the Facilitation recorded in Facilitator data set 650 from "pending" to "recovered".

If the Top-Up results in Prepaid Account 300 having a new balance that is less than the Facilitation amount (or the Facilitation amount plus Facilitation Fee), or if some funds in Prepaid Account 300 are already reserved for other purposes, such that the entire Facilitation amount (possibly plus a Facilitation Fee) is not available for charging, communication "O" may charge Prepaid Account 300 only for whatever amount of funds is available. Facilitator 600 may then update the status of the Facilitation recorded in Facilitator data set 650 from "pending" to "partially recovered". Facilitator 600 may then wait to attempt to recover the remaining portion of the Facilitation amount (possibly plus any Facilitation Fee) at the next notification of a Top-Up to Prepaid Account 300. As discussed above, the Facilitation fee may be logged to be charged to the Operator, the SOPP or a third party (e.g., a Sponsor), if not to the Prepaid Account.

In some embodiments, funds that have been debited from Prepaid Account 300 on behalf of Facilitator 600 (for example, to recover an Advance that was previously provided to Prepaid Account 300) may at some point be transferred to Facilitator 600 through exchange "P", as illustrated in FIG. 11. In some embodiments, such funds transfers may be performed periodically, e.g., monthly, through a batch accounting reconciliation process. For example, a funds transfer "P" may be performed from the prepaid platform to Facilitator 600 monthly, with all funds debited from all Prepaid Accounts on the prepaid platform in connection with recovery of Advances over the past month. Similarly, funds debited from Prepaid Accounts on behalf of SOPP 500 may be transferred to SOPP 500 at periodic intervals (e.g., monthly) through a batch accounting reconciliation process.

In the foregoing discussion of examples it has been indicated that the SOPP receives the full purchase price for the product and/or service purchased by the User. However, it may be that the SOPP receives only the full purchase price net of an Operator commission or fee and net of some amount used to pay all or part of the fee to the Facilitator, if desired. If there is a fee for the Facilitation and it is being paid by the SOPP, it may be paid to the Facilitator on such terms and at such times as they have agreed, and may be withheld by the Operator from the SOPP's Account on the Facilitator's behalf.

If there is no SOPP involved, for example in normal voice calls (e.g., charge per minute or per second of communication) or in internet access, which is typically charge per kilobyte or by a quality of service or bandwidth standard, then the fee may be paid to the Facilitator by the Operator or a Sponsor such as an advertiser, or revenue (incremental or otherwise) may be shared between the parties. In some embodiments, for data flows and/or bounded data transactions, the percentage of revenue sharing that is retained by the Facilitator and/or by the Operator may be determined individually for each SOPP, and may be different for different SOPPs.

In some embodiments, if Prepaid Account 300 has a pending Guarantee Facilitation and no Top-Up is made to Prepaid Account 300 within a certain time period (e.g., within ninety days) from the date of the Facilitation or from the date of the most recent Top-Up, Facilitator 600 may assume responsibility for the debt pursuant to a guarantee agreement with Operator 200 and/or SOPP 500. Facilitator 600 may then write off the Facilitation amount and update its status to "non-recoverable" in Facilitator data set 650. In some embodiments, Facilitator 600 may initiate a funds transfer "Q", immediately upon the debt expiration date or during periodic reconciliation batch processing (e.g. monthly), to pay the Guarantee (Facilitation) amount to Operator 200. Operator 200 may already have paid the purchase price to SOPP 500, and thus funds transfer "Q" may serve as a reimbursement to Operator 200; alternatively, if SOPP 500 has not yet been paid for the product and/or service purchased via the non-recoverable Facilitation, Facilitator 600 may transfer the guaranteed funds directly (or through Operator 200) to SOPP 500. In some embodiments, some or all of the revenue from any successfully facilitated purchase of the product and/or service may be shared by SOPP 500 with Facilitator 600 and/or Operator 200, and such revenue sharing may be implemented in any suitable amounts and/or proportions though any suitable reconciliation process, as aspects of the present invention are not limited in this respect.

In some embodiments, when Facilitator 600 is forced to write off a Facilitation amount that is not recoverable from Prepaid Account 300 due to lack of timely Top-Up, Facilitator 600 may de-provision Prepaid Account 300 in Facilitator data set 650, such that Prepaid Account 300 will no longer be eligible for DCO for future transactions. Subscribers (and their corresponding Prepaid Accounts) may also become de-provisioned for DCO when they are migrated to a different account status, such as to a postpaid account or other type of account, when the Account is migrated to another Operator as a result of number portability, or when an Account is suspended by the Operator for other reasons, such as suspected fraud, loss of SIM/terminal and theft, among others. In some embodiments, when a Subscriber with a pending Facilitation is migrated to a postpaid account, migrated to another Operator or otherwise suspended, Operator 200 may assume responsibility for the Facilitation amount, and may pay the Facilitation amount to Facilitator 600 (in the case of an Advance) or to SOPP 500 (in the case of a Guarantee). Such conciliation may be done through a batch process.

Figure 12:
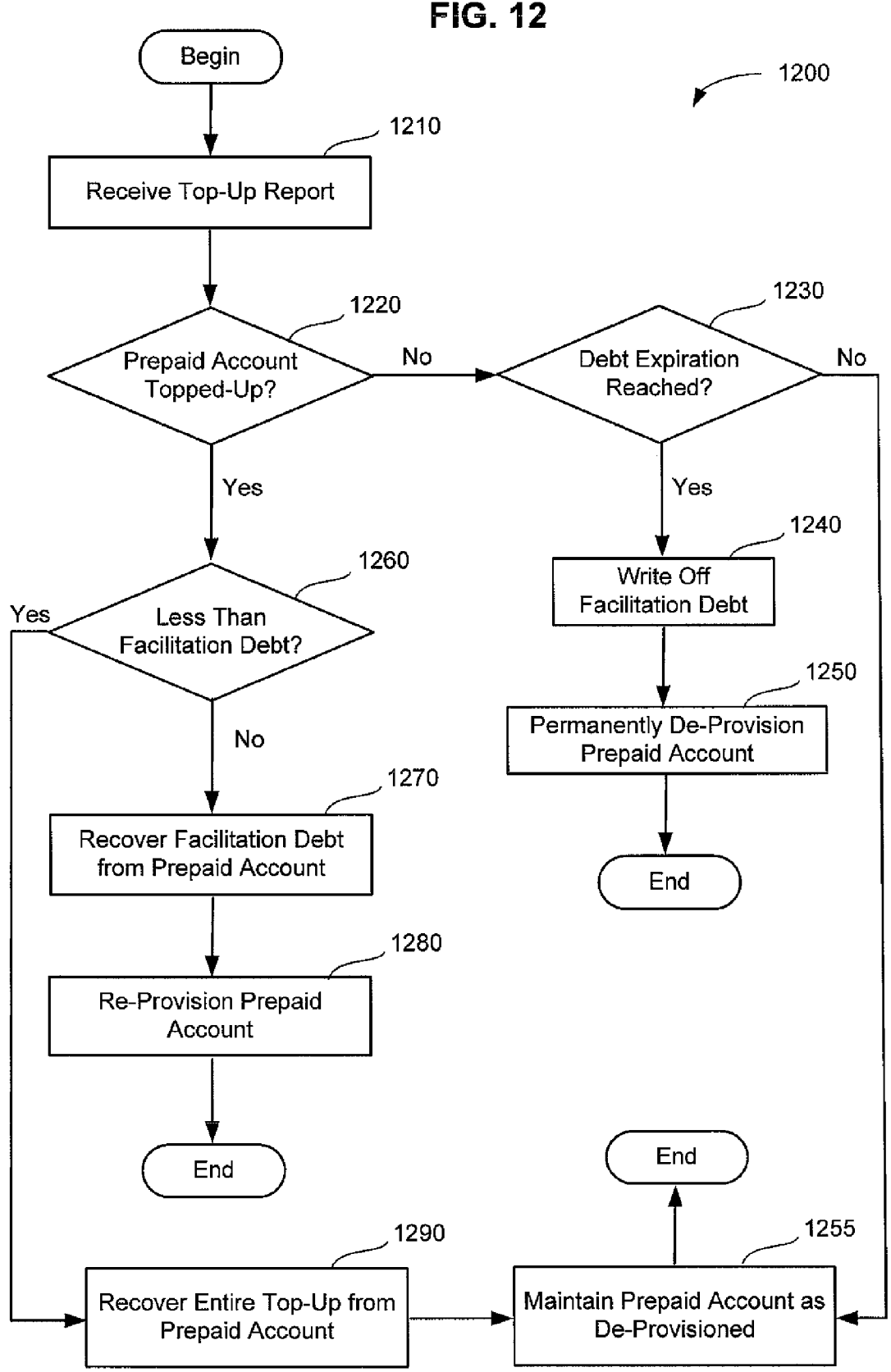
FIG. 12 is a flow diagram summarizing the recovery process illustrated in FIG. 11.

In summary, FIG. 12 illustrates an exemplary method 1200 for recovering a Facilitation amount previously advanced or guaranteed for a Prepaid Account, in accordance with some embodiments of the present invention. Method 1200 may be performed by a Facilitator, such as Facilitator 600; as discussed above, functions of a Facilitator may be performed by an Operator, a SOPP or a third party service.

Method 1200 begins at act 1210, at which a Top-Up report may be received. As described above, an example of a Top-Up report is communication "N" transmitted by the prepaid account platform of Prepaid Account 300 to Facilitator 600. In some embodiments, a Top-Up report may indicate that a Top-Up or other replenishment of funds has just been performed on a Prepaid Account managed by the prepaid account platform. In other embodiments, a Top-Up report may include a list of all Prepaid Accounts managed by the prepaid account platform that have received Top-Ups or other funds replenishment in the period of time since the previous Top-Up report (e.g., within the last five minutes, or other suitable period of time). In addition, the Top-Up report may include the amount of any Top-Up or funds replenishment listed in the Top-Up report. Top-Up reports may also be queried by the Facilitator.

At act 1220, the Top-Up report may be examined to determine whether any of the listed Top-Ups were performed to a Prepaid Account for which a Facilitation amount that has not yet been recovered is recorded, e.g., in a data set maintained by and/or accessible by the Facilitator. For a given Prepaid Account for which a Facilitation amount is outstanding, if the Top-Up report does not indicate that a Top-Up or other funds replenishment has been performed to that Prepaid Account, method 1200 may proceed to act 1230, at which a determination may be made as to whether the date of debt expiration has been reached for the Facilitation in question. In some embodiments, a Subscriber's debt from a previous Facilitation may expire if the Facilitation amount cannot be recovered from the Prepaid Account within a certain period of time, e.g., if no User Tops Up the Prepaid Account within ninety days of the date of the Facilitation. It should be appreciated that any suitable period of time may be used to establish a debt expiration date, as aspects of the present invention are not limited in this respect.

In some embodiments, if it is determined at act 1230 that the date of debt expiration has been reached, method 1200 may proceed to act 1240 at which the Facilitation debt may be written off. In some embodiments, the Facilitator may update the status of the Facilitation debt (e.g., the Facilitation amount, or any portion of the Facilitation amount currently outstanding, i.e., unrecovered) recorded in the Facilitator's data set from "pending" to "non-recoverable". If the Facilitation was a Guarantee, the Facilitator may additionally perform a transfer of funds in the amount of the remaining Facilitation debt to reimburse the Operator and/or SOPP in accordance with the Guarantee. In some embodiments, the Prepaid Account and/or Subscriber who defaulted on the Facilitation debt may then be permanently de-provisioned for DCO at act 1250. (A phone number associated with a permanently de-provisioned Prepaid Account and/or Subscriber may at some point become reactivated, for instance if the associated Subscriber is deactivated by the Operator, and the phone number is recycled and reactivated at a later time, in association with a new Subscriber.) In some embodiments, a defaulting Subscriber or Prepaid Account may never again be eligible for DCO; in other embodiments, eligibility may be regained after a suitable period of time or after a suitable showing of credit-worthiness. Criteria for becoming re-provisioned for DCO may be specified in any suitable way or form, as aspects of the present invention are not limited in this respect.

If it is determined at act 1230 that the date of debt expiration on an outstanding Facilitation debt has not yet been reached, method 1200 may proceed to act 1255, at which the corresponding Prepaid Account may be maintained as "pending recovery" and not currently provisioned for DCO. As described above, in some embodiments, any Prepaid Account with any amount of Facilitation debt outstanding may be de-provisioned (i.e., ineligible) for DCO until the Facilitation debt is recovered. In other embodiments, a certain limited number of Facilitations or a certain limited monetary amount of total Facilitation debt may be permitted while maintaining a Prepaid Account as provisioned for DCO. Any suitable limits on Facilitation debt and/or number of outstanding Facilitations may be placed on Prepaid Account eligibility for DCO, including no limits at all, as aspects of the present invention are not limited in this respect.

If it is determined at act 1220 that a Top-Up or other replenishment of funds was performed to a Prepaid Account for which a Facilitation is outstanding, as indicated by the Top-Up report, method 1260 may proceed from act 1220 to act 1260. The amount of the Top-Up indicated by the Top-Up report may then be compared with the amount of outstanding Facilitation debt. The Facilitation debt may be the entire Facilitation amount from the previous Facilitation, if no partial recoveries have been made since the time of the Facilitation. The Facilitation debt may also be a different amount larger or smaller than the Facilitation amount of the previous Facilitation, depending on whether multiple Facilitations are allowed without complete intervening recovery, and on whether partial amounts have been recovered from any previous Top-Ups. If the amount of the current Top-Up is not less than the amount of outstanding Facilitation debt, the entire amount of outstanding Facilitation Debt may be recovered from the Top-Up at act 1270. The status of the Facilitation amount(s) recorded in the Facilitator's data set for the Prepaid Account may then be updated from "pending" to "recovered". At act 1280, the Prepaid Account may be re-provisioned for DCO owing to the successful recovery of the Facilitation amount(s) previously Advanced or Guaranteed, and method 1200 may end.

If the amount of the current Top-Up is less than the amount of outstanding Facilitation debt for the Prepaid Account, method 1200 may proceed from act 1260 to act 1290, at which the entire Top-Up amount may be recovered from the Prepaid Account and put toward the outstanding Facilitation debt. Because the entire Facilitation debt amount was not able to be recovered, the status of the unrecovered Facilitation amount(s) recorded in the Facilitator's data set may remain as "pending", and the Facilitator may wait to attempt to recover the outstanding debt from the next Top-Up. At act 1255, the Prepaid Account and its Subscriber may be maintained as de-provisioned for DCO, and act 1200 may end. In some embodiments, the Facilitator or Operator platform may limit the maximum recovery to a percentage or maximum amount, in relation to a Top-Up, so as to not consume the complete Top-Up, for certain Users or under certain circumstances.

To facilitate recovery of Facilitations, provisioning of Subscribers, Prepaid Accounts and transactions, and credit scoring of Subscribers, Prepaid Accounts, product/service IDs, SOPP IDs, and/or other User/Subscriber information or User/Subscriber history information, a Facilitator such as Facilitator 600 may in some embodiments store one or more data records, e.g., in Facilitator data set 650, in association with Subscribers and/or Prepaid Accounts. In some embodiments, Facilitator data set 650 may store one or more data records for each Facilitation provided by Facilitator 600, including one or more of the following data fields for each Account ID and/or User/Subscriber ID:

Transaction ID: A unique identifier for the transaction that was facilitated. In some embodiments, the transaction ID may be generated and attached to initial communications involved in the transaction by Operator 200.

Facilitation ID: An internal identifier for the Facilitation transaction, assigned and referenced by Facilitator 600.

SOPP ID: A unique identifier for the SOPP 500 providing the product and/or service purchased through the transaction that was facilitated.

Product/Service ID: A unique identifier for the product and/or service whose purchase was facilitated.

Purchase Price: The price determined for the product and/or service whose purchase was facilitated. The purchase price may be specific to the individual transaction, and may take into account one or more price promotions applied to the transaction.

Facilitation Amount: The currency amount of the Facilitation provided.

Facilitation Date/Time: The data and time at which the Facilitation was provided, and/or the date and time of the timestamp for the transaction.

Facilitation Status: For example, "recovered", "partially recovered" or "pending".

In some embodiments, Facilitator data set 650 may store one or more data records for each recovery attempted for a given Facilitation. In some cases in some embodiments, multiple recovery attempts may be made for a single Facilitation, for example, if subsequent Top-Ups only allow for partial recovery of the Facilitation amount. The one or more data records for each recovery may include one or more of the following data fields:

Recovery ID: A unique identifier for the attempted recovery transaction.

Facilitation ID: The internal identifier for the Facilitation transaction, assigned and referenced by Facilitator 600.

Recovered Amount: The amount of funds that were successfully recovered through the attempted recovery transaction. The recovered amount may be any amount between zero and the Facilitation amount, inclusive.

Recovery Date/Time: The date and time at which the recovery was attempted and/or completed.

In some embodiments, Facilitator data set 650 may store one or more data records for each Prepaid Account (or equivalently, the Subscriber corresponding to the Prepaid Account), including one or more of the following data fields:

Account ID: A unique identifier for the Prepaid Account.

Mobile Phone Number: The IMSI and/or MSISDN associated with the Prepaid Account.

DCO Connection Date: The most recent date when the DCO service was connected for the Account.

DCO Disconnection Date: The date when the Subscriber requested disconnection of the DCO service, if the Subscriber is currently disconnected.

DCO Status: The Account's status as provisioned or de-provisioned (not provisioned) for DCO (e.g., Eligible, Not eligible, Active, Inactive, Opt-In, Opt-Out, Black List, etc.)

Facilitations to Recover: The number of pending Facilitations that have been provided for the Account but have not yet been recovered. In some embodiments, the Account may be de-provisioned for DCO unless this number is zero, or is less than another suitable maximum number.

Maximum Allowed Facilitation Amount: The maximum currency amount that will be allowed for any single Facilitation for the Prepaid Account. In some circumstances, a Facilitation may be denied if the required Facilitation amount exceeds the maximum allowed Facilitation amount. In other circumstances, a Facilitation may be denied if the predetermined purchase price exceeds the maximum allowed Facilitation amount.

Amount of Most Recent Facilitation: The currency amount of the Facilitation most recently provided to the Prepaid Account.

Date of Most Recent Facilitation: The date of the Facilitation most recently provided to the Prepaid Account.

Amount of Most Recent Recovery: The currency amount most recently recovered from the Prepaid Account to offset one or more previously provided Facilitations.

Pending Debt: The amount of funds pending and un-recovered from previous completed Facilitations.

Debt Expiration Date: The date at which the pending debt will become non-recoverable, and/or the number of days until such date. In some embodiments, pending debt may become non-recoverable (e.g., written off) ninety days from the date the debt was incurred (e.g., the Facilitation date) or from the date of the most recent Top-Up.

Credit Scoring Segment: (Described below)

Date of Most Recent Top-Up: The date on which funds were most recently added to the Prepaid Account.

Amount of Most Recent Top-Up: The currency amount of the Top-Up most recently credited to the Prepaid Account.

Average Top-Up (3M): The average amount of all Top-Ups to the Prepaid Account in the most recent three months.

Average Consumption (3M): The average price of purchases made via the Prepaid Account in the most recent three months. In some embodiments, the purchases considered may be limited to purchase transactions provisioned for DCO, while in other embodiments, other purchases made via the Prepaid Account may also be considered.

Average Top-Up (M-1): The average amount of all Top-Ups in the most recent month.

Average Consumption (M-1): The average price of purchases made via the Prepaid Account in the most recent month.

Average Top-Up (M-2): The average amount of all Top-Ups in the most recent two months.

Average Consumption (M-2): The average price of purchases made via the Prepaid Account in the most recent two months.

It should be appreciated that much of the above information may be available from internal records stored by Facilitator 600 each time a request for facilitation is received in response to an Insufficient Balance Event with respect to an attempted purchase of a product and/or service. Information related to Top-Up history may be collected through the recovery processes described above, from periodic Top-Up reports provided to Facilitator 600 by Operator 200. Consumption history information, including prices of past purchases made via Prepaid Accounts, may be collected from Facilitation records, Operator records and/or SOPP records.

In some embodiments, information collected and stored in Facilitator data set 650 in association with Subscribers and/or their Prepaid Accounts may be used by Facilitator 600 to perform a form of credit scoring of the Subscribers and/or their Prepaid Accounts, to assign a maximum allowed Facilitation amount, and/or concurrent Facilitation events, to each Prepaid Account. In one example of such scoring, DCO-provisioned Prepaid Accounts may be segmented into groups (credit scoring segments) based on their average consumption (e.g., average price of past purchases of products and/or services), and/or Top-Up behavior (e.g., frequency, amount and recency of Top-Up events) over the most recent three months. The groups may be defined such that Prepaid Accounts with similar average consumption prices and/or Top-Up behavior are grouped together. If consumption history is not available, the Prepaid Accounts may be similarly segmented into groups based on average Top-Up amount over the most recent three months. Each group (segment) of Prepaid Accounts may then be assigned a different maximum allowed Facilitation amount, such that a group with lower average consumption prices is assigned a lower maximum allowed Facilitation amount than a group with higher average consumption prices. Every Prepaid Account within the same group (segment) may be assigned the same maximum allowed Facilitation amount. In some embodiments, the assigned maximum allowed Facilitation amounts may be determined by multiplying each group's average consumption price by a constant factor. In such a way, Facilitation amounts in subsequent DCO processes may be limited to amounts that are reasonably consistent with the history of past purchases made via the Prepaid Account. Some segments may be deemed not eligible for DCO. In some further embodiments, such credit scoring information determined for DCO-provisioned Prepaid Accounts by Facilitator 600 (as well as any other suitable information collected by Facilitator 600 in the course of DCO-related processing as described above) may be stored and/or shared with other entities and/or institutions, such as financial institutions, as part of a credit rating service for Prepaid Accounts. In some embodiments, Subscriber consent may be obtained before sharing credit scoring information about the Subscriber's Prepaid Account with other entities.

Having thus described certain embodiments of systems and methods for practicing aspects of this invention, it is to be appreciated that various alterations, modifications, and improvements will readily occur to those skilled in the art. Such alterations, modifications, and improvements are intended to be part of this disclosure, and are intended to be within the spirit and scope of the invention. For example, the Operator's computer system may host some or all of the Facilitator's processing and data, to reduce network traffic and reduce the time it takes to make and act on decisions regarding Facilitations. If the Operator does not host the Facilitator's platform, then the Operator's user or billing data base, or at least relevant portions thereof, might be duplicated at a Facilitator's platform so as to provide for the Facilitator faster access to the data it needs to rate a Subscriber and/or Prepaid Account and determine whether to provide a Facilitation. Even when the Operator hosts the Facilitator's processing, some Subscriber and/or Prepaid Account, and/or SOPP product/service records, such as provisioning data, may be duplicated for use by the Facilitator's system. In a variation of a non-Operator hosted arrangement, a Facilitator's platform may be operated independently of an Operator so as to service multiple Operators from a single Facilitator platform. When this is done, each Operator's platform may query the Facilitator's platform when it notes an insufficient funds transaction is being requested, to determine whether the Facilitator will provide a Facilitation. Indeed, an Operator may make the inquiry of multiple Facilitators, who may compete for the business. Accordingly, the foregoing description and drawings are by way of example only.

Figure 13:
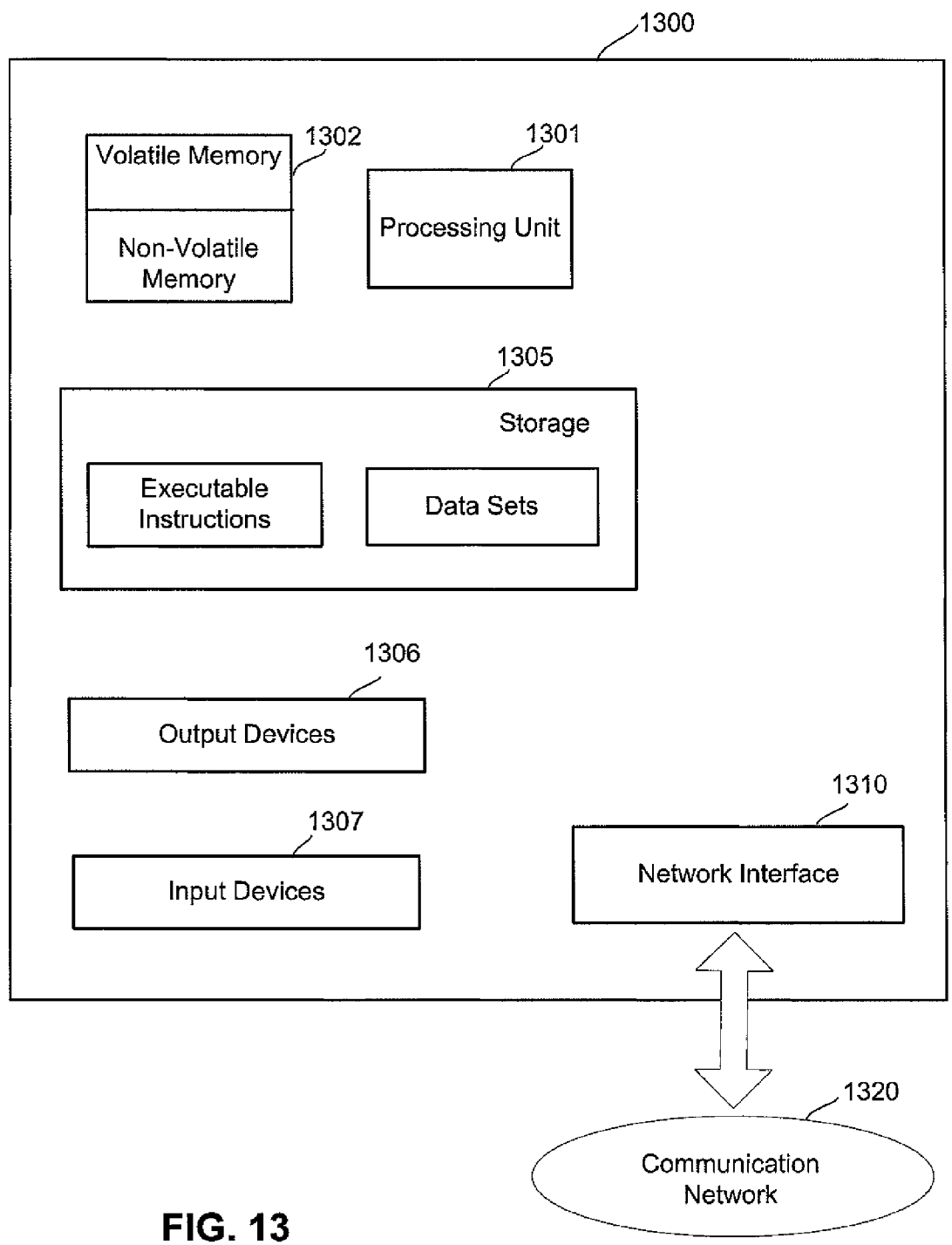
FIG. 13 is a block diagram illustrating an exemplary computing system for use in practicing some embodiments of the present invention.

Various inventive aspects described herein may be used with any of one or more computers and/or devices each having one or more processors that may be programmed to take any of the actions described above for facilitating purchases of products and/or services via Prepaid Accounts. For example, Operator servers, Facilitator servers and SOPP servers may be implemented as one or more computers, as described above. FIG. 13 shows, schematically, an illustrative computer 1300 on which various inventive aspects of the present disclosure may be implemented. The computer 1300 includes a processor or processing unit 1301 and a memory 1302 that may include volatile and/or non-volatile memory. The computer 1300 may also include storage 1305 (e.g., one or more disk drives) in addition to the system memory 1302.

The memory 1302 and/or storage 1305 may store one or more computer-executable instructions to program the processing unit 1301 to perform any of the functions described herein. The storage 1305 may optionally also store one or more datasets as needed. For example, a computer used to implement a server for Facilitator 600 may in some embodiments store Facilitator data set 650 in storage 1305. Alternatively, such datasets may be implemented separately from a computer used to implement Facilitator 600.

References herein to a computer can include any device having a programmed processor, including a rack-mounted computer, a desktop computer, a laptop computer, a tablet computer or any of numerous devices that may not generally be regarded as a computer, which include a programmed processor (e.g., a PDA, an MP3 Player, a mobile telephone, wireless headphones, etc.).

The exemplary computer 1300 may have one or more input devices and/or output devices, such as devices 1306 and 1307 illustrated in FIG. 13. These devices may be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

As shown in FIG. 13, the computer 1300 may also comprise one or more network interfaces (e.g., the network interface 1310) to enable communication via various networks (e.g., the network 1320). Examples of networks include a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory and/or tangible computer readable storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which examples have been provided. The acts performed as part of any method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method comprising:
   determining or receiving notification that a balance of a first Prepaid Account, associated with a Subscriber and a Mobile Device, is insufficient for a purchase of a product and/or a service being attempted in a particular transaction via the first Prepaid Account;
   analyzing, using at least one computer, usage history associated with an Account ID of the first Prepaid Account and not uniquely associated with the Subscriber, to compute one or more risk measures associated with the Account ID, the analyzing comprising:
      analyzing at least a Top-Up history associated with the Account ID to assign the first Prepaid Account to a first group of a plurality of groups to which Prepaid Accounts of a plurality of Prepaid Accounts are assigned based at least on recency, frequency and monetary value of past Top-Ups of the Prepaid Accounts, the first group including Prepaid Accounts of the plurality of Prepaid Accounts having similar Top-Up histories to the first Prepaid Account, and
      analyzing at least a consumption history of the first Prepaid Account and the Prepaid Accounts having similar Top-Up histories to the first Prepaid Account to assign a maximum allowed Facilitation amount to the first group of Prepaid Accounts as a function of at least an average price of past purchases made via Prepaid Accounts in the first group;

determining, based on the one or more risk measures associated with the Account ID, whether to facilitate the particular transaction being attempted via the first Prepaid Account, the determining comprising comparing a Facilitation amount required to facilitate the particular transaction with the maximum allowed Facilitation amount for the first group of Prepaid Accounts to which the first Prepaid Account is assigned;

if it is determined to facilitate the particular transaction being attempted, instructing, via the at least one computer, an Operator associated with the first Prepaid Account and/or a Service or Product Provider (SOPP) associated with the product and/or the service to allow completion of the particular transaction being attempted, without interrupting the particular transaction to require a Top-Up of the first Prepaid Account; and if it is determined not to facilitate the particular transaction, issuing a denial for the particular transaction.

2. The method of claim 1, further comprising:
advancing the Facilitation amount to the first Prepaid Account; and/or
guaranteeing the Facilitation amount to the Operator and/or the SOPP.

3. The method of claim 2, further comprising determining the Facilitation amount based on a known or estimated price of the product and/or the service whose purchase is being attempted in the particular transaction.

4. The method of claim 3, in which determining the Facilitation amount comprises determining the Facilitation amount based on a known or estimated price that is specific to the particular transaction being attempted and is different from at least one other price specific to a different transaction to purchase the same product and/or service via a different Prepaid Account.

5. The method of claim 3, in which determining the Facilitation amount comprises determining the Facilitation amount to be equal to the known or estimated price.

6. The method of claim 3, in which determining the Facilitation amount comprises determining the Facilitation amount based on an amount of insufficiency of the first Prepaid Account with respect to the known or estimated price.

7. The method of claim 2, further comprising recovering at least a portion of the Facilitation amount from one or more subsequent Top-Ups of the first Prepaid Account performed after the completion of the particular transaction.

8. The method of claim 2, further comprising recovering at least a portion of the Facilitation amount from a third party contribution to the first Prepaid Account made after the completion of the particular transaction.

9. The method of claim 2, further comprising paying the Operator and/or the SOPP if the Facilitation amount is not recovered from the first Prepaid Account within a specified time period.

10. The method of claim 1, further comprising recovering a Facilitation Fee from the first Prepaid Account and/or from another party.

11. The method of claim 1, further comprising:
transmitting at least one Facilitation offer message to the Mobile Device; and
receiving at least one acceptance response to the at least one Facilitation offer message from the Mobile Device before instructing the Operator and/or the SOPP to allow completion of the particular transaction.

12. The method of claim 1, in which instructing the Operator and/or SOPP to allow completion of the particular transaction comprises instructing the Operator and/or SOPP to release the product and/or the service to the Mobile Device.

13. At least one non-transitory computer-readable medium encoded with computer-executable instructions that, when executed, perform a method comprising:
determining or receiving notification that a balance of a first Prepaid Account associated with a Subscriber and a Mobile Device is insufficient for a purchase of a product and/or a service being attempted in a particular transaction via the first Prepaid Account;

analyzing usage history associated with an Account ID of the first Prepaid Account and not uniquely associated with the Subscriber, to compute one or more risk measures associated with the Account ID, the analyzing comprising:
analyzing at least a Top-Up history associated with the Account ID to assign the first Prepaid Account to a first group of a plurality of groups to which Prepaid Accounts of a plurality of Prepaid Accounts are assigned based at least on recency, frequency and monetary value of past Top-Ups of the Prepaid Accounts, the first group including Prepaid Accounts of the plurality of Prepaid Accounts having similar Top-Up histories to the first Prepaid Account, and
analyzing at least a consumption history of the first Prepaid Account and the Prepaid Accounts having similar Top-Up histories to the first Prepaid Account to assign a maximum allowed Facilitation amount to the first group of Prepaid Accounts as a function of at least an average price of past purchases made via Prepaid Accounts in the first group;

determining, based on the one or more risk measures associated with the Account ID, whether to facilitate the particular transaction being attempted via the first Prepaid Account, the determining comprising comparing a Facilitation amount required to facilitate the particular transaction with the maximum allowed Facilitation amount for the first group of Prepaid Accounts to which the first Prepaid Account is assigned;

if it is determined to facilitate the particular transaction being attempted, instructing an Operator associated with the first Prepaid Account and/or a Service or Product Provider (SOPP) associated with the product and/or the service to allow completion of the particular transaction being attempted, without interrupting the particular transaction to require a Top-Up of the first Prepaid Account; and if it is determined not to facilitate the particular transaction, issuing a denial for the particular transaction.

14. The at least one non-transitory computer-readable medium of claim 13, in which the method further comprises:
advancing the Facilitation amount to the first Prepaid Account; and/or
guaranteeing the Facilitation amount to the Operator and/or the SOPP.

15. The at least one non-transitory computer-readable medium of claim 14, in which the method further comprises determining the Facilitation amount based on a known or estimated price of the product and/or the service whose purchase is being attempted in the particular transaction.

16. The at least one non-transitory computer-readable medium of claim 15, in which determining the Facilitation amount comprises determining the Facilitation amount based on a known or estimated price that is specific to the particular transaction being attempted and is different from at least one other price specific to a different transaction to purchase the same product and/or service via a different Prepaid Account.

17. The at least one non-transitory computer-readable medium of claim 15, in which determining the Facilitation amount comprises determining the Facilitation amount to be equal to the known or estimated price.

18. The at least one non-transitory computer-readable medium of claim 15, in which determining the Facilitation amount comprises determining the Facilitation amount based on an amount of insufficiency of the first Prepaid Account with respect to the known or estimated price.

19. The at least one non-transitory computer-readable medium of claim 14, in which the method further comprises recovering at least a portion of the Facilitation amount from one or more subsequent Top-Ups of the first Prepaid Account performed after the completion of the particular transaction.

20. The at least one non-transitory computer-readable medium of claim 14, in which the method further comprises recovering at least a portion of the Facilitation amount from a third party contribution to the first Prepaid Account made after the completion of the particular transaction.

21. The at least one non-transitory computer-readable medium of claim 14, in which the method further comprises paying the Operator and/or the SOPP if the Facilitation amount is not recovered from the first Prepaid Account within a specified time period.

22. The at least one non-transitory computer-readable medium of claim 13, in which the method further comprises recovering a Facilitation Fee from the first Prepaid Account and/or from another party.

23. The at least one non-transitory computer-readable medium of claim 13, in which the method further comprises:
    transmitting at least one Facilitation offer message to the Mobile Device; and
    receiving at least one acceptance response to the at least one Facilitation offer message from the Mobile Device before instructing the Operator and/or the SOPP to allow completion of the particular transaction.

24. The at least one non-transitory computer-readable medium of claim 13, in which instructing the Operator and/or SOPP to allow completion of the particular transaction comprises instructing the Operator and/or SOPP to release the product and/or the service to the Mobile Device.

25. Apparatus comprising:
    at least one network communication interface;
    at least one processor communicatively coupled to the at least one network communication interface; and
    at least one computer-readable storage medium, communicatively coupled to the at least one processor, storing processor-executable instructions that, when executed by the at least one processor, perform a method comprising:
        determining or receiving notification that a balance of a first Prepaid Account associated with a Subscriber and a Mobile Device is insufficient for a purchase of a product and/or a service being attempted in a particular transaction via the first Prepaid Account;
        analyzing usage history associated with an Account ID of the first Prepaid Account and not uniquely associated with the Subscriber, to compute one or more risk measures associated with the Account ID; the analyzing comprising:
            analyzing at least a Top-Up history associated with the Account ID to assign the first Prepaid Account to a first group of a plurality of groups to which Prepaid Accounts of a plurality of Prepaid Accounts are assigned based at least on recency, frequency and monetary value of past Top-Ups of the Prepaid Accounts, the first group including Prepaid Accounts of the plurality of Prepaid Accounts having similar Top-Up histories to the first Prepaid Account, and
            analyzing at least a consumption history of the first Prepaid Account and the Prepaid Accounts having similar Top-Up histories to the first Prepaid Account to assign a maximum allowed Facilitation amount to the first group of Prepaid Accounts as a function of at least an average price of past purchases made via Prepaid Accounts in the first group;
        determining, based on the one or more risk measures associated with the Account ID, whether to facilitate the particular transaction being attempted via the first Prepaid Account, the determining comprising comparing a Facilitation amount required to facilitate the particular transaction with the maximum allowed Facilitation amount for the first group of Prepaid Accounts to which the first Prepaid Account is assigned;
        if it is determined to facilitate the particular transaction being attempted, instructing an Operator associated with the first Prepaid Account and/or a Service or Product Provider (SOPP) associated with the product and/or the service, via the at least one network communication interface, to allow completion of the particular transaction being attempted, without interrupting the particular transaction to require a Top-Up of the first Prepaid Account; and
        if it is determined not to facilitate the particular transaction, issuing a denial for the particular transaction.

26. The apparatus of claim 25, in which the method further comprises:
    advancing the Facilitation amount to the first Prepaid Account; and/or
    guaranteeing the Facilitation amount to the Operator and/or the SOPP.

27. The apparatus of claim 26, in which the method further comprises determining the Facilitation amount based on a known or estimated price of the product and/or the service whose purchase is being attempted in the particular transaction.

28. The apparatus of claim 27, in which determining the Facilitation amount comprises determining the Facilitation amount based on a known or estimated price that is specific to the particular transaction being attempted and is different from at least one other price specific to a different transaction to purchase the same product and/or service via a different Prepaid Account.

29. The apparatus of claim 27, in which determining the Facilitation amount comprises determining the Facilitation amount to be equal to the known or estimated price.

30. The apparatus of claim 27, in which determining the Facilitation amount comprises determining the Facilitation amount based on an amount of insufficiency of the first Prepaid Account with respect to the known or estimated price.

31. The apparatus of claim 26, in which the method further comprises recovering at least a portion of the Facilitation amount from one or more subsequent Top-Ups of the first Prepaid Account performed after the completion of the particular transaction.

32. The apparatus of claim 26, in which the method further comprises recovering at least a portion of the Facilitation amount from a third party contribution to the first Prepaid Account made after the completion of the particular transaction.

33. The apparatus of claim 26, in which the method further comprises paying the Operator and/or the SOPP if the Facilitation amount is not recovered from the first Prepaid Account within a specified time period.

34. The apparatus of claim 25, in which the method further comprises recovering a Facilitation Fee from the first Prepaid Account and/or from another party.

35. The apparatus of claim 25, in which the method further comprises:
   transmitting at least one Facilitation offer message to the Mobile Device; and
   receiving at least one acceptance response to the at least one Facilitation offer message from the Mobile Device before instructing the Operator and/or the SOPP to allow completion of the particular transaction.

36. The apparatus of claim 25, in which instructing the Operator and/or SOPP to allow completion of the particular transaction comprises instructing the Operator and/or SOPP to release the product and/or the service to the Mobile Device.

\* \* \* \* \*